US010130047B2

(12) United States Patent
Surany

(10) Patent No.: US 10,130,047 B2
(45) Date of Patent: Nov. 20, 2018

(54) RECONFIGURABLE SOLAR ARRAY AND METHOD OF MANAGING CROP YIELD USING THE SAME

(71) Applicant: Surany Research and Development LLC, Havre de Grace, MD (US)

(72) Inventor: Andrew P. Surany, Havre de Grace, MD (US)

(*) Notice: Subject to any disclaimer, the term of this patent is extended or adjusted under 35 U.S.C. 154(b) by 370 days.

(21) Appl. No.: 14/851,183

(22) Filed: Sep. 11, 2015

(65) Prior Publication Data

US 2016/0073591 A1   Mar. 17, 2016

Related U.S. Application Data

(60) Provisional application No. 62/048,984, filed on Sep. 11, 2014.

(51) Int. Cl.
| *A01G 13/02* | (2006.01) |
| *F16B 7/10* | (2006.01) |
| *H02S 30/20* | (2014.01) |
| *H02S 20/10* | (2014.01) |
| *F24S 90/00* | (2018.01) |

(Continued)

(52) U.S. Cl.
CPC .......... *A01G 13/0206* (2013.01); *F16B 7/105* (2013.01); *F24S 25/10* (2018.05); *F24S 25/617* (2018.05); *F24S 90/00* (2018.05); *H02S 20/10* (2014.12); *H02S 30/20* (2014.12); *A01G 9/243* (2013.01); *F24S 2025/012* (2018.05);

(Continued)

(58) Field of Classification Search
CPC ......... A01G 13/0206; A01G 9/243; F24J 2/42
See application file for complete search history.

(56) References Cited

U.S. PATENT DOCUMENTS

| 4,095,369 A | 6/1978 | Posnansky et al. |
| 4,527,544 A | 7/1985 | Wolf et al. |

(Continued)

FOREIGN PATENT DOCUMENTS

| CH | 706132 A2 * | 8/2013 | ............. A01G 9/243 |
| DE | 102005039494 A1 * | 3/2007 | ......... A01G 13/0206 |

(Continued)

OTHER PUBLICATIONS

Dupraz, C., et al. "Combining solar photovoltaic panels and food crops for optimizing land use: Towards new agrivoltaic schemes." Renewable Energy. Vo. 36. 2001. pp. 2725-2732.

(Continued)

*Primary Examiner* — Kristen C Hayes
(74) *Attorney, Agent, or Firm* — Whiteford, Taylor & Preston, LLP; Gregory M. Stone

(57) ABSTRACT

A method and apparatus are provided that combine solar technology and agriculture in a symbiotic relationship that optimizes revenue from both sources. An array of reconfigurable solar collector assemblies is deployed in a crop field. As various crops benefit from varying degrees of shade through their development cycles, and are prone to damage from high winds and hail, the array of adaptable, reconfigurable solar collectors is deployed in the crop field and allows for the easy reconfiguration of each solar collector assembly to vary the amount of shade that is applied to the crops below the assembly, and to provide maximum hail and wind protection when necessary.

16 Claims, 17 Drawing Sheets

(51) Int. Cl.
 F24S 25/10 (2018.01)
 F24S 25/617 (2018.01)
 A01G 9/24 (2006.01)
 F24S 25/00 (2018.01)
(52) U.S. Cl.
 CPC .............. *Y02A 40/266* (2018.01); *Y02E 10/47* (2013.01); *Y02P 60/124* (2015.11)

(56) References Cited

U.S. PATENT DOCUMENTS

| | | | |
|---|---|---|---|
| 4,836,232 A * | 6/1989 | De Rosa | A45B 11/00 135/118 |
| 6,405,742 B1 * | 6/2002 | Driscoll | A45B 11/00 135/20.1 |
| 7,162,833 B2 * | 1/2007 | Faris | A01G 13/0206 47/58.1 LS |
| 7,537,015 B1 | 5/2009 | Molnar, IV et al. | |
| 7,673,415 B2 * | 3/2010 | Wan | A01G 1/00 47/20.1 |
| 7,888,587 B2 | 2/2011 | Shingleton et al. | |
| 8,136,292 B2 | 3/2012 | Morgan | |
| 8,375,966 B2 | 2/2013 | Kuelbs | |
| 8,426,791 B2 | 4/2013 | Silver | |
| 8,429,861 B2 | 4/2013 | Conger | |
| 8,453,659 B2 | 6/2013 | Li | |
| 9,088,181 B2 * | 7/2015 | Akin | H02J 7/35 |
| 9,380,748 B2 * | 7/2016 | Nallakrishnan | A01G 13/0206 |
| 2005/0091916 A1 * | 5/2005 | Faris | A01G 9/243 47/39 |
| 2005/0105970 A1 * | 5/2005 | Faris | A01G 13/0206 405/41 |
| 2008/0148631 A1 * | 6/2008 | Wan | A01G 13/0206 47/22.1 |
| 2009/0101135 A1 | 4/2009 | Tsai | |
| 2009/0107038 A1 * | 4/2009 | Wan | A01G 1/00 47/22.1 |
| 2009/0293933 A1 | 12/2009 | Clark | |
| 2010/0212719 A1 | 8/2010 | Stolum | |
| 2010/0272569 A1 | 10/2010 | Benton | |
| 2011/0113683 A1 | 5/2011 | Morgan | |
| 2011/0120523 A1 | 5/2011 | Silver | |
| 2011/0277809 A1 | 11/2011 | Dalland et al. | |
| 2012/0216850 A1 | 8/2012 | Chu | |
| 2013/0092199 A1 | 4/2013 | Berland | |
| 2013/0327371 A1 | 12/2013 | Hui et al. | |
| 2014/0014182 A1 | 1/2014 | Furihata et al. | |
| 2014/0028242 A1 | 1/2014 | Akin et al. | |
| 2014/0077055 A1 | 3/2014 | Hamilton | |
| 2014/0261596 A1 * | 9/2014 | Nallakrishnan | A01G 13/0206 135/94 |
| 2014/0283894 A1 | 9/2014 | Silver | |
| 2017/0126172 A1 * | 5/2017 | Nogier | H02S 20/30 |

FOREIGN PATENT DOCUMENTS

| | | | | |
|---|---|---|---|---|
| DE | 102013002825 A1 * | 8/2014 | ............. | A01G 25/00 |
| FR | 2963720 A1 * | 2/2012 | ......... | A01G 13/0206 |
| WO | WO-2014114966 A1 * | 7/2014 | ............. | F03D 9/007 |
| WO | WO-2014198838 A1 * | 12/2014 | ............. | A01G 9/243 |

OTHER PUBLICATIONS

International Search Report issued in co-pending International Application No. PCT/US15/49599 dated Feb. 2, 2016.
"Average Weather for Des Moines, IA—Temperature and Precipitation." Average Weather for Des Moines, IA—Temperature and Precipitation. N.p., n.d. Web. Feb. 27, 2017.http://www.weather.com/weather/wxclimatology/monthly/graph/USIA0231.
"Corn Growing Degree Days." North Dakota Agricultural Network. N.p., n.d. Web. Oct. 12, 2013. <http://ndawn.ndsu.nodak.edu/help-corn-growing-degree-days.html>.
Duncan, William, Donald Shaver, and William Williams. "Sunlight and Temperature Effects on Corn Growth and Yield." California Agriculture Aug. 1977: 13-14. Print.
Hillaker, Harry J., and Paul J. Waite. "Crop-Hail Damage in the Midwest Corn Belt." Journal of Climate and Applied Meteorology 24.1 (1985): 3-15. Print.
Irwin, Scott, and Darrel Good. "How Bad Was the 2012 Corn and Soybean Growing Season? farmdocdaily.illinois.edu." How Bad Was the 2012 Corn and Soybean Growing Season? farmdocdaily.illinois.edu. N.p., n.d. Web. Oct. 14, 2013. <http://farmdocdaily.illinois.edu/2012/10/how-bad-was-the-2012-corn-and-.html>.
Kimball, John. "Transpiration." Transpiration. N.p., n.d. Web. Nov. 14, 2014. http://users.rcn.com/jkimball.ma.ultranet/BiologyPages/T/Transpiration.html.
Kranz, William, Suat Irmak, Simon Van Donk, C Yonts, and Derrel Martin. "Irrigation Management for Corn." NebGuide. N.p., n.d. Web. Oct. 14, 2013. <http://www.ianrpubs.unl.edu/epublic/live/g1850/build/g1850.pdf>.
Lauer, Joe. "Late-Season Hail Effects on Corn." Agronomy Advice. University of Wisconsin, n.d. Web. Sep. 12, 2013. <corn.agronomy.wisc.edu/AA/pdfs/A069.pdf>.
Neilson, Bob . "Drought and Heat Stress Effects on Corn Pollination (Purdue)." The Corn Growers Guidebook. Purdue University, n.d. Web. Aug. 29, 2013. <http://www.agry.purdue.edu/ext/corn/pubs/com-07.htm>.
Neilson, Bob. "Requirements for Uniform Germination and Emergence in Corn—Corny News Network (Purdue University)." Corny News Network Articles. Purdue University, n.d. Web. Sep. 4, 2013 <http://www.agry.purdue.edu/ext/corn/news/timeless/germemergreq.html>.
Roth, Greg, and Mark Antle. "Effects of Hail Damage on Corn Silage Yield and Quality—Crops and Soils—Penn State Extension." Penn State Extension—Penn State College of Ag Sciences. N.p., n.d. Web. Sep. 15, 2013. <http://extension.psu.edu/plants/crops/grains/corn/silage/effects-of-hail-damage-on-corn-silage-yield-and-quality>.
Sterling, Tracy. "Transpiration—Water Movement through Plants." Plant and Soil Sciences eLibrary. N.p., n.d. Web. Dec. 4, 2013. <http://passel.unl.edu/pages/informationmodule.php?idinformationmodule=1092853841&topicorder=1&maxto=8&minto=1>.
Strachan, Stephen. "Corn Grain Yield in Relation to Stress During Ear Development." Pioneer. Dupont, n.d. Web. Sep. 13, 2013. <https://www.pioneer.com/home/site/us/agronomy/library/template.CONTENT/guid.B26CF867-3B1D-4DC9-A1B4-61215FD6F5BA.
"The Water Cycle: Evapotranspiration.", from USGS Water-Science School. N.p., n.d. Web. Dec. 4, 2013. <http://ga.water.usgs.gov/edu/watercycleevapotranspiration.html>.
"WeatherSpark Beta." Average Weather for Des Moines, Iowa, USA. N.p., n.d. Web. Oct. 19, 2013. <http://weatherspark.com/averages/30088/Des-Moines-Iowa-United-States>.
Windbreaks. Plasticulture. Penn State Extension. Feb. 27, 2017. <http://extension.psu.edu/plants/plasticulture/production-details/windbreaks>.
Helmers, Glenn A. and James Brandle. "Optimum Windbreak Spacing in Great Plains Agriculture." Fall 2005. University of Nebraska—Lincoln. Digital Commons@ University of Nebraska—Lincoln. <http://digitalcommons.unl.edu/cgi/viewcontent.cgi?article=1796&context=greatplainsresearch>.
Abendroth, Lori J, and Roger W Elmore. "Corn Growth and Development." Iowa State University. N.p., n.d. Web. Aug. 12, 2013. <www.ipm.iastate.edu/ipm/files/03%20Corn%20Growth%20and%20Development.pdf>.
Neilson, Bob . "Stress and the Common Corn Plant." Minnesota Crop Pest Management. Purdue University, n.d. Web. Aug. 28, 2013. agronomy.cfans.umn.edu/prod/groups/cfans/@pub/@cfans/@agronomy/documents/asset/cfans_asset_289558.pdf.
"Corn Growth Stages with Estimated Calendar Days and Growing Degree Units." Crop Management. N.p., n.d. Web. Aug. 13, 2011. <www.sdstate.edu/ps/extension/crop-mgmt/corn/upload/Corn-growth-stage-day-and-GDU-calendar10.pdf>.

(56) References Cited

OTHER PUBLICATIONS

Pohly, John. "How much water." How much water. Colorado State University Horticulture, n.d. Web. Oct. 17, 2013. http://www.colostate.edu/Depts/CoopExt/4DMG/Xeris/howmuch.htm.
Hall, Robert, and Edward Twidwell. "Effects of Drought Stress on Corn Production." SDSU Cooperative Extension Service. N.p., n.d. Web. Nov. 5, 2013. <http://igrow.org/up/resources/03-2008-2012.pdf>.
Supplementary Partial European Search Report issued in corresponding European Application No. 15839997 dated Mar. 15, 2018.

* cited by examiner

This graph depicts potential shading percentages along with the possible dates associated with that developmental stage. Planting typically in the Corn Belt states occurs in early to mid April. Shading is implemented once the corn canopy is completely formed. At this point leaves are still developing and growing, however, the crop captures all sunlight and little to none is lost and absorbed by the soil. Tasseling and Silking typically occur during the month of July beginning the reproductive stages of the crop.

FIGURE 1

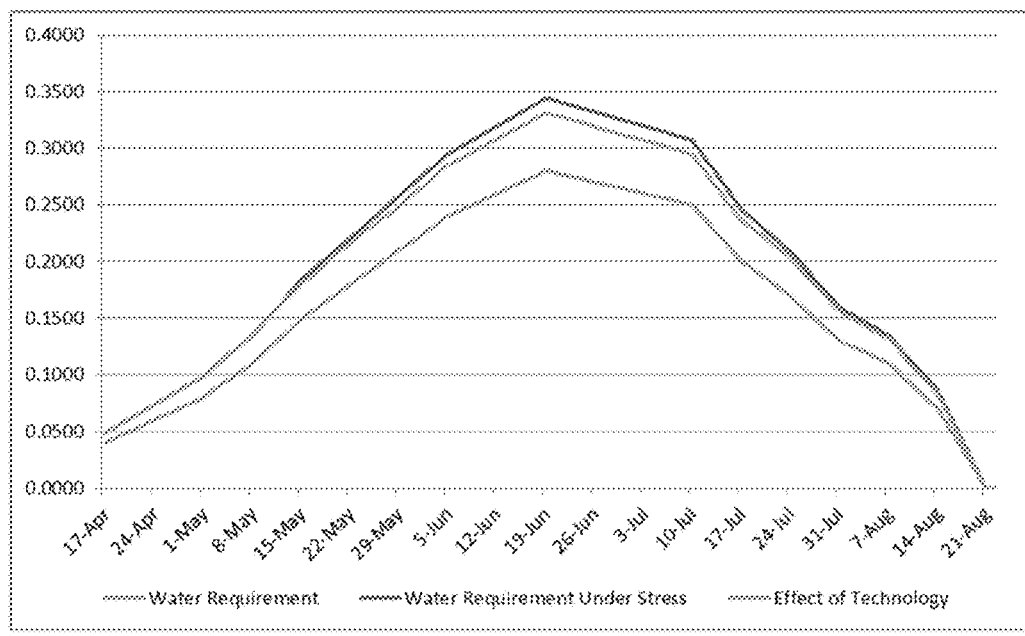

Under stress factors such as drought or excessive dry heat corn uses more water to do the same tasks than it normally would. In irrigated fields this means that farm owners must increase the frequency or magnitude of their irrigation in order to meet the needs of the crop. In the case of non-irrigated fields it means that the crop, which is already deprived of water, needs even more rainfall than it normally would in order to meet its needs.

FIGURE 2

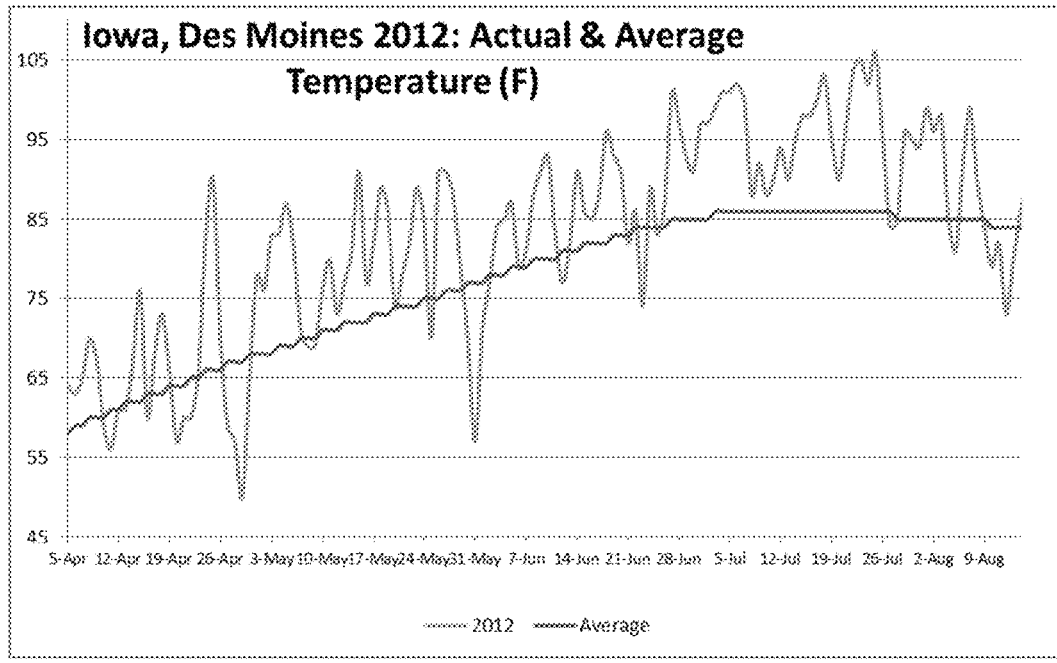

This graph depicts the average temperature in Des Moines, Iowa compared to the actual temperature in 2012. Temperatures were variable during 2012 in Iowa; however, in June, July, and August temperatures were far above the average and remained that way. During this period in corn growth tasseling and silking were occurring, therefore, the extreme heat negatively impacted pollen shed, most likely killing most of the pollen and damaging the silks.

FIGURE 3

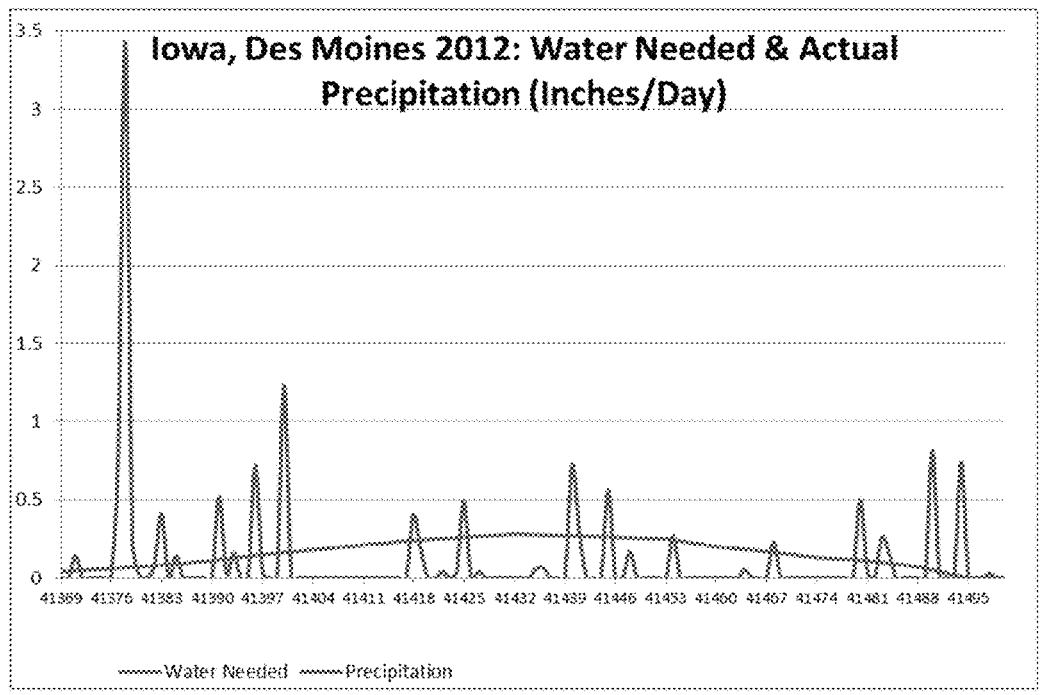

This graph depicts the water requirement for corn growth over time in Des Moines, Iowa compared to the actual precipitation values in 2012. This graph depicts the lack of precipitation in Iowa during 2012 resulting in the drought that heavily impacted corn yields. Corn needs about 21.37 inches of water for growth; however, in 2012 in Des Moines, Iowa the there was only a total precipitation of 14.04 inches.

FIGURE 4

This graph depicts the water requirement of corn in inches compared to the average precipitation, along with a graphical representation of the water deficit. From this graph there is a water deficit of 5.44 inches between average rainfall and the corn water requirement.

This graph depicts the decrease in corn yield with varying percentages of defoliation.

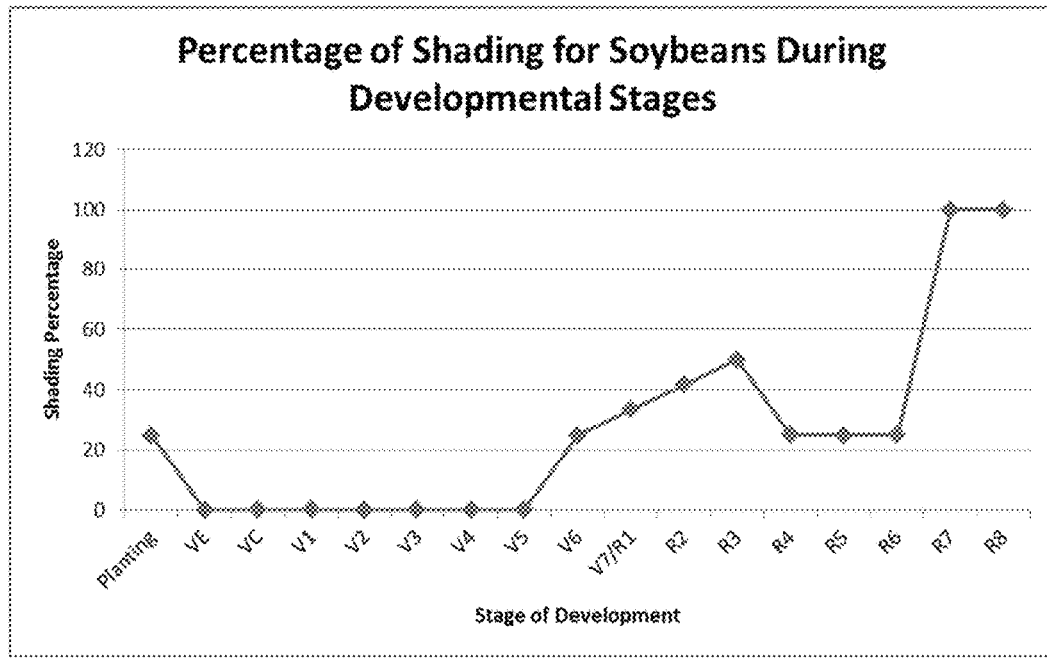

This graph depicts the shading regime for soybean plants. From planting to VE the plant would be at a 25% shading before dropping to 0% from VE to V5 during which the canopy is forming. Once the plant reaches V6 shading begins to increase in increments until R3 during which it will decrease to 25%. From R3 to R6 the plant requires as much sunlight as it can intercept, otherwise, yields will drastically decrease. Once the plant begins its final stages of maturity at R7 100% shade can be implemented.

FIGURE 8

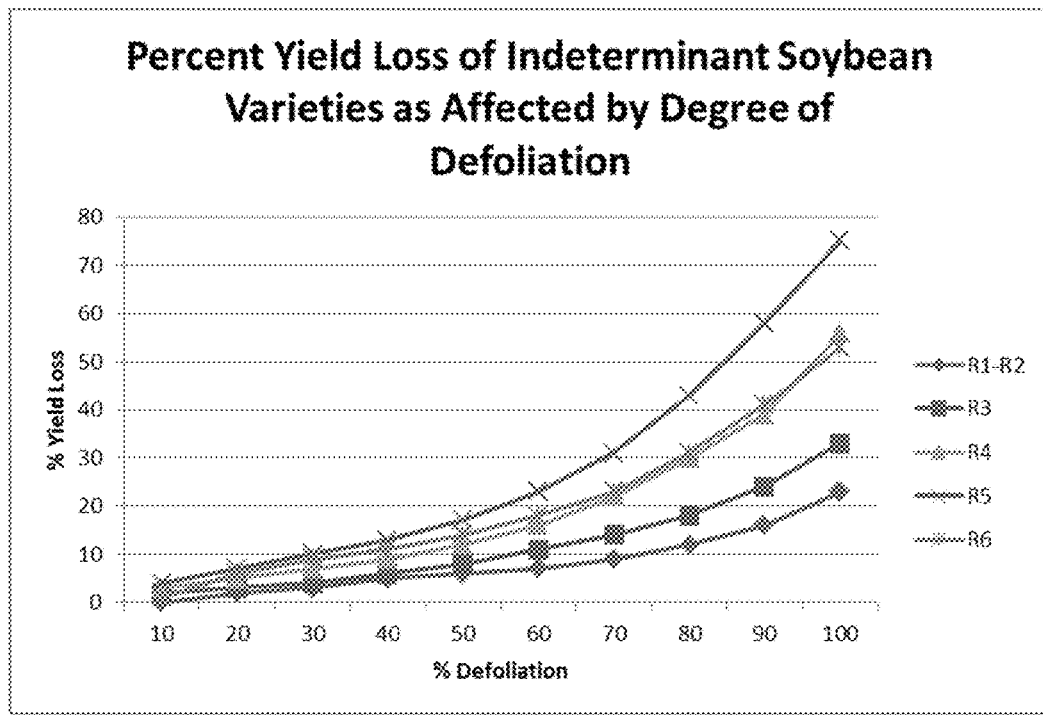

This graph depicts the percent yield loss of indeterminate soybean varieties as affected by degree of defoliation. As can be seen by this graph, R5 is the most susceptible to yield loss due to hail damage, whereas, R1-R2 are the least susceptible. During the earlier stages the plant is better able to recuperate after defoliation due to hail damage. This chart has been adapted from "Evaluating Hail Damage to Soybeans" (Robert N. Klein et al, 2011).

FIGURE 9

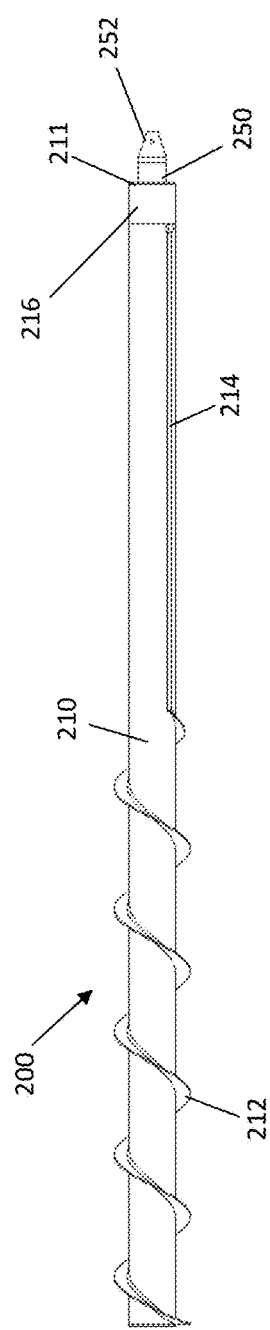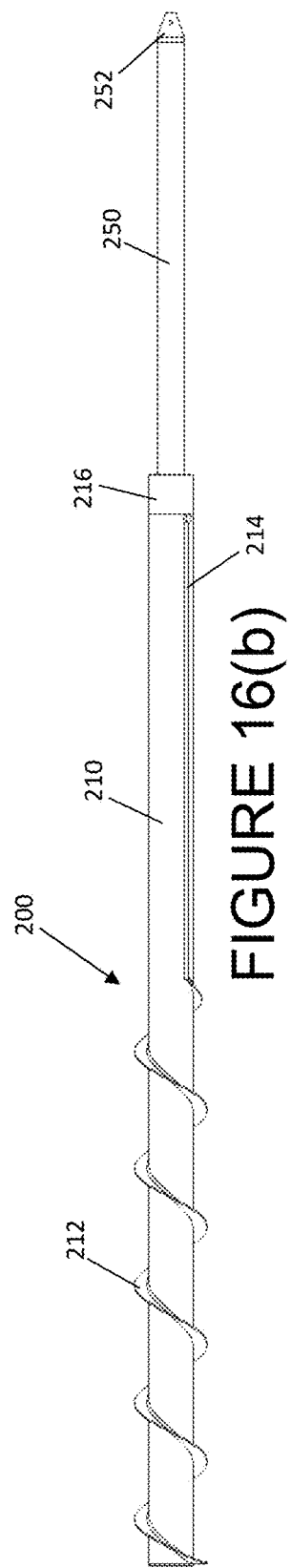
FIGURE 16(a)
FIGURE 16(b)

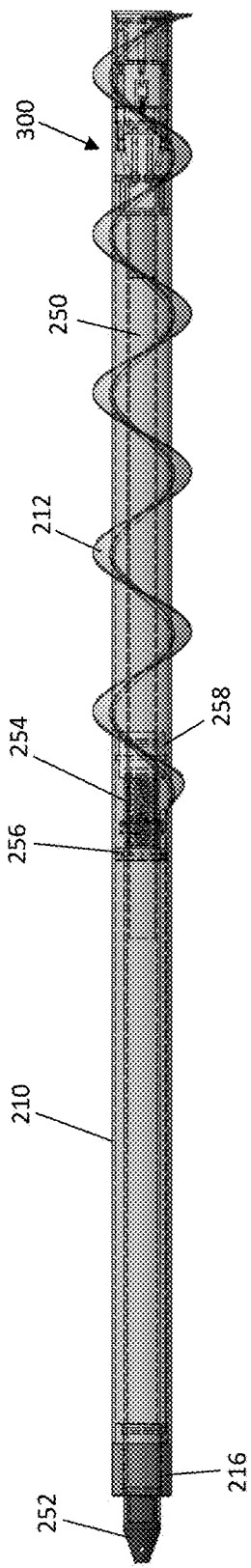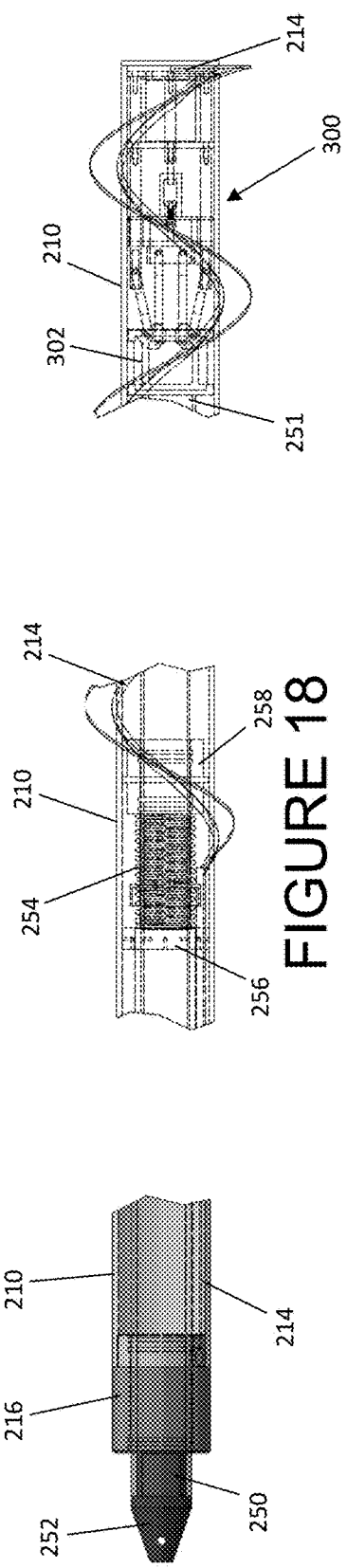
FIGURE 17
FIGURE 18

US 10,130,047 B2

RECONFIGURABLE SOLAR ARRAY AND METHOD OF MANAGING CROP YIELD USING THE SAME

CROSS REFERENCE TO RELATED APPLICATION

This application is based upon co-owned U.S. Provisional Patent Application Ser. No. 62/048,984 entitled "Reconfigurable Solar Array and Method of Managing Crop Yield Using the Same," filed with the U.S. Patent and Trademark Office on Sep. 11, 2014, the specification of which is incorporated herein by reference.

FIELD OF THE INVENTION

The present invention relates to systems for crop management and solar generation, and more particularly to reconfigurable solar arrays and their use for managing crop yield through shading and physical crop protection, and a method of optimizing revenue from a crop through use of a reconfigurable solar array to optimize solar energy collection and crop yield for the crop in the field in which such array is installed.

BACKGROUND

Crop yield is a factor that significantly affects the health and well-being of entire populations. As crops mature, they encounter a wide variety of environmental stresses that can have a significantly negative effect on crop yield, and a related negative political and economic impact on the populations that rely on production from such crops. For example, excessive heat, drought, wind, and hail may all have damaging effects on crop yield for a wide variety plants. Many efforts have been made to improve the resiliency of crops to such negative environmental impacts, but development of affordable and thus widely distributable and successful solutions remains a challenge.

Moreover, while solar energy production technology continues to develop and provides hope for renewable energy production, its current wide-spread use has many challenges. For instance, infrastructure expenses, real estate expenses, and real estate availability all create challenges to widespread deployment and use of solar collection systems. While much real estate is devoted to crop production, the negative impact that traditional solar collection assemblies would have on crop fields if placed on the same real estate has prevented their combined use, despite the wide availability of such real estate.

It would therefore be advantageous to provide methods for optimizing crop yield by mitigating damage caused to crops by excessive heat, drought, wind, and hail, while simultaneously making the real estate housing such crops available for solar energy production.

SUMMARY OF THE INVENTION

Disclosed is a method and apparatus that combine solar technology and agriculture in a symbiotic relationship that optimizes revenue from both sources. More particularly, through use of the disclosed method and apparatus, solar collection may make use of zero land and maintenance costs, lower power line losses, higher power purchase agreement returns, and scalable/lower overall costs, while agriculture gains may be experienced from higher crop yields and lower risks of loss due to drought, hail, and other adverse environmental impacts.

An array of adaptable, reconfigurable solar collector assemblies is deployed in a crop field. As various crops benefit from varying degrees of shade through their development cycles (i.e., providing partial shading during periods of high solar stress for better pollination, and during periods of increased drought to reduce the effects of evaporation and transpiration), and are prone to damage from high winds and hail, the array of adaptable, reconfigurable solar collectors is deployed in the crop field and allows for the easy reconfiguration of each solar collector assembly to vary the amount of shade that is applied to the crops below the assembly, and to provide maximum hail and wind protection when necessary. The array is configured for easy removal from the crop field, having a permanently installed base that retracts to below ground level for plowing, seeding, and harvesting as necessary, and a removable support for the solar collector assembly that may be removed for plowing, seeding, and harvesting as necessary. The support for the solar collector assembly is sufficiently flexible so as to allow the collector assembly to bend in excessive wind conditions, and the collector assembly itself is configured to change its configuration in response to excessive wind conditions, thus allowing the array to adapt to such excessive wind conditions and minimizing the risk of breakage or other failure as a result of such excessive wind conditions. Such an automatically adaptable configuration allows the solar array to serve as a windbreak for the crop over which it is installed.

BRIEF DESCRIPTION OF THE DRAWINGS

The numerous advantages of the present invention may be better understood by those skilled in the art by reference to the accompanying drawings in which:

FIG. 1 is a graphical representation of percent shading to be applied to corn crops through varied developmental stages in accordance with certain aspects of an embodiment of the invention.

FIG. 2 is a graphical representation of corn's water requirement during optimum conditions and under stress.

FIG. 3 is a graphical representation of the average temperature in Des Moines, Iowa compared to actual temperature in 2012.

FIG. 4 is a graphical representation of the water requirement for corn growth over time in Des Moines, Iowa compared to actual precipitation values in 2012.

FIG. 8 is a graphical representation of percent shading to be applied to soy crops through varied development stages in accordance with certain aspects of an embodiment of the invention.

FIG. 9 is a graphical representation of soybean yield loss in relation to percent defoliation during different stages of plant growth.

FIG. 16(a) is a side view of a telescoping base for use with the solar collector of FIG. 10 in a fully retracted position.

FIG. 16(b) is a side view of the telescoping base of FIG. 16(a) in a fully deployed position.

FIG. 17 is a side, partially cross-sectional view of the telescoping base of FIGS. 16(a) and 16(b).

FIG. 18 is an exploded, partially cross-sectional view of the telescoping base of FIG. 17.

DETAILED DESCRIPTION OF THE PREFERRED EMBODIMENTS

Figure 5:
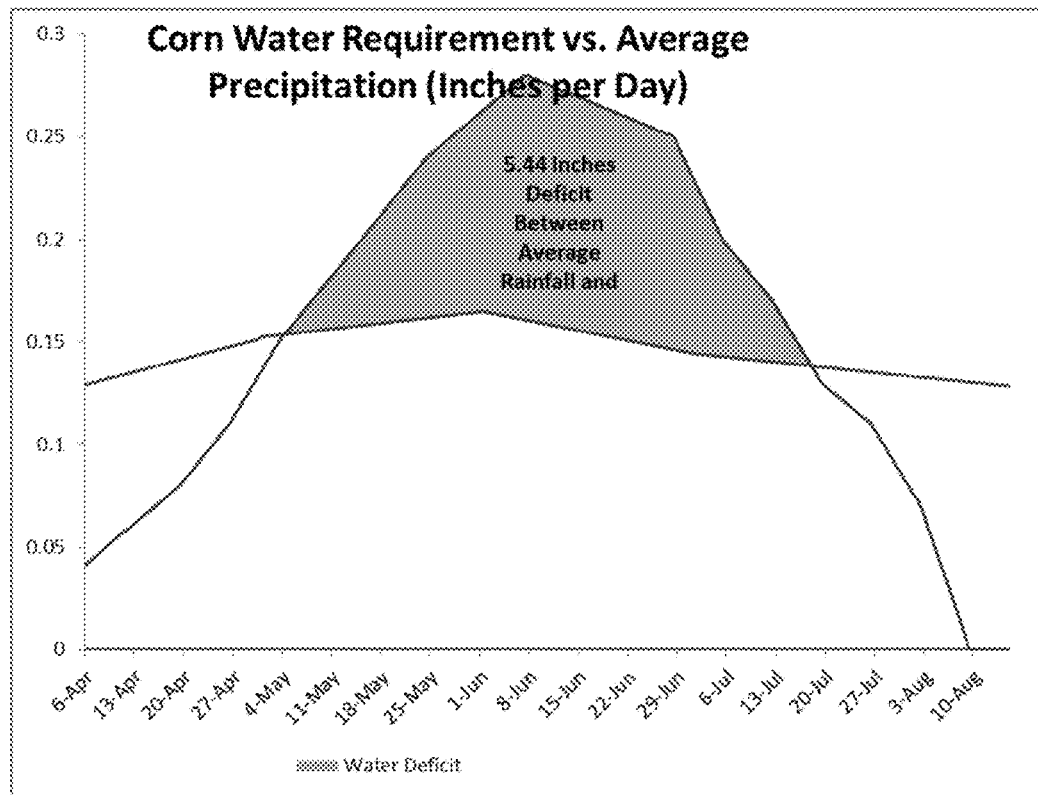
FIG. 5 is a graphical representation of the water requirement of corn compared to the average precipitation and a graphical representation of the water deficit.

The following description is of one or more particular embodiments of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

The system and method described herein provide for a technology symbiosis between solar energy and crop growth. The technology employs a removable, temporary, adaptable and reconfigurable solar array which when deployed:

a. Provides a removable panel assembly for purposes of plowing and tilling;
b. Provides for a permanently installed base which may be manually or electrically compressed such that it is below plow/till level, and may be manually or electrically released to allow for reconnection of the panel assembly;
c. Provides a signaling mechanism through the array interconnected power lines to reveal and release/recover the position of each installed base location;
d. Is adaptable to changing weather conditions, including the ability to dynamically modify its structure to absorb the forces and stresses of high wind/wind gusts;
e. Provides for easy location and recovery of mounting (ground) infrastructure for replacement/re-establishment of the panel array assemblies;
f. Provides a mechanism to diffuse light and water onto crops by allowing for the replacement or adjustment of each of the sub-panel assemblies with light and/or water diffuser technology. The specific level of light required and the pattern of diffused water through the sub-panel assemblies is specifically tailored to the growing requirements of the crop;
g. Provides up to nearly full cover based on close spacing of individual array elements. Each element may be specifically adjusted to control light levels onto crops;
h. Is adjustable for purposes of regulating the amount of sunlight available to crops.

Such a system and method provide numerous benefits, including one or more of the following:

a. Increased crop yield associated with a solar array in accordance with certain aspects of an embodiment of the invention, which provides partial shading of crops (e.g., corn) during periods of high solar stress, allowing for better pollination;
b. Increased crop yield associated with reduced wind damage to crops associated with a solar array in accordance with certain aspects of an embodiment of the invention, which provides an adaptability to function as a wind break during periods of high wind/wind gusts;
c. Increased crop yield associated with a solar array in accordance with certain aspects of an embodiment of the invention, which provides for the partial shading of crops during periods of increased drought to reduce the effects of evaporation and transpiration;
d. Decreased soil erosion of agricultural land especially under drought conditions associated with a solar array in accordance with certain aspects of an embodiment of the invention, which provides an adaptability to function as a wind break during periods of high wind/wind gusts; and
e. Decreased crop loss due to the effects of hail and/or heavy rain.

While the following exemplary description describes a corn crop as a primary example, the system and method of the invention are likewise applicable to other crops, such as soy, and may be used as described herein in the management of yield from such other crops without departing from the spirit and scope of the instant invention.

The following description details first a method for managing crop yield through variable shading created by a reconfigurable solar array, and second an apparatus in accordance with an exemplary embodiment of the invention suitable for use in such reconfigurable solar array.

I. Crop Yield Management Through Variable Shading Using a Reconfigurable Solar Collection Array.

For corn, the length of time from planting to maturity varies depending on the hybrid chosen; however, the 120-day hybrid is the most commonly grown in the US, especially in the Corn-Belt. Corn development is divided into two stages, the vegetative stages and the reproductive stages. During the vegetative stages the corn plant undergoes seed germination, emergence, root growth, leaf growth, vertical growth, and finally ends with the development of tassels. These stages are numbered according to leaf number emergence (V1–Vn). The photosynthetic factory, that which provides energy and nutrients to produce kernels, develops during the vegetative stages. During the Reproductive Stages tasseling, silking, pollination, fertilization, and grain-fill occur ending with complete physiological maturation of the kernels. At this point sugars in the kernels are almost completely converted into starches. Corn growth is highly dependent on temperature and moves through its developmental stages based upon GDD's, a calculation that is used to measure changing temperature. GDD's are a cumulative addition of temperatures above a certain degree; for corn this base temperature is 50 degrees F. Table 1 below provides a list of the different developmental stages along with descriptions.

TABLE 1

Corn development stages listed with descriptions and accumulated GDD's. All vegetative stages are labeled VE, V1, V2, V3, V4, etc. with the number relating to the number of leaves developed on the plant. During vegetative stages the stalk, leaves, and root system are developing. Reproductive stages are labeled R1, R2, R3, R4, etc. relating to the specific reproductive stage the plant has entered into. Once the plant enters into the reproductive stages gathered energy from previous and current photosynthesis is used to produce the kernels in the ears, eventually converting these sugars into starches.

| Phase | Development Stage | GDD |
|---|---|---|
| | Planting | 0 |
| Vegetative | Two leaves fully emerged | 200 |
| | Four leaves fully emerged | 345 |
| | Six leaves fully emerged (growing point above soil) | 476 |
| | Eight leaves fully emerged (tassel beginning to develop) | 610 |
| | Ten leaves fully emerged | 740 |
| | Twelve leaves fully emerged (ear formation) | 870 |
| | Fourteen leaves fully emerged (silks developing on ear) | 1000 |
| | Sixteen leaves fully emerged (tip of tassel emerging) | 1135 |
| Reproductive | Silks emerging/pollen shedding (plant at full height) R1 | 1400 |
| | Kernels in blister stage R2 | 1660 |
| | Kernels in dough stage R3 | 1925 |
| | Kernels denting R4 | 2190 |
| | Kernels dented R5 | 2450 |
| | Physiological maturity R6 | 2700 |

A variety of stressors can reduce corn yield, including drought, extreme heat, wind, and hail. These stressors affect ear size, ear length, kernel weight, kernel number, and kernel row number. Excessive heat and drought reduce water available for the plant, stunting growth and causing leaves to wilt. Drought can desynchronize the pollen shed and silking, resulting in poor fertilization. In addition, temperatures over 95 F can dry out pollen and desiccate silks, inhibiting fertilization of the embryos. Hail can defoliate, damage, or kill an entire plant. These three stressors are a common occurrence for farmers during the growing season, frequently resulting in lost yield. By applying technologies described herein in accordance with aspects of an embodiment of the invention, a farmer would be able to reduce the risk of losing yield to these very common stressors.

A system and method according to aspects of an embodiment of the invention are implemented above an active crop resulting in beneficial effects to that crop. These effects are of two types: "Cover" and "Protection". "Cover" is defined as the deployment of a solar array in accordance with certain aspects of an embodiment of the invention such that a controlled amount of sunlight is blocked from reaching the ground, and therefore the crop itself. "Percent Cover" is a measure of the reduced level of solar energy reaching the ground. "Protection" is defined as the deployment of a solar array in accordance with certain aspects of an embodiment of the invention such that negative environmental effects on crop yield are minimized.

Throughout the life of the crop there are a number of growth stages during which Cover and Protection are not only viable but also beneficial. The amount of Cover and Protection applied defines both the level of solar energy produced as well as the benefit to crop yield. There is a balance: weighting solar energy too heavily results in excessive cover to the crops and lower crop yield. Too much emphasis on increased crop yield results in a non-viable economic model for solar energy.

The inventor herein has determined that there is a balance point at which the solar economic model is viable and at which there is sufficient additional crop yield to warrant the existence of the solar array. The following discussion addresses the specific benefits to crop yield achieved at this balance point.

Crop pollination stages are extremely vulnerable and critical periods in plant development. Using corn as an example, pollination is very susceptible to moisture stress and excessive heat. Depending on the region and the date of planting, silking and tasseling will typically fall between the months of June and July during which temperatures are typically high. As such, a higher Percent of Coverage would lower temperatures, reducing the stress during critical growth periods.

While corn is used as a basis for pollination benefits, other crops affected by heat stress are equally a candidate for the technologies described herein.

A deployed array in accordance with certain aspects of an embodiment of the invention serves as a wind break reducing the amount of soil erosion. In addition—and more importantly, the array serves as a humidity "buffer", reducing wind and air turbulence at the plant. Higher moisture levels at the plant level result in lower water evaporation and transpiration.

The deployed array also provides for better wintering of agricultural land by virtue of a wind break. Snow is more evenly distributed resulting in more even runoff.

Such a deployed array also provides drought protection in the following ways:

a. Reduction of direct solar loading on the plants resulting in lower levels of transpiration.

b. Reduction of temperature at the plant level resulting in a more humid environment under the array. This in turn lowers the amount of evaporation of the moisture under the array and plant transpiration levels, and reduces the amount of water necessary for the plant to thrive.

Such a deployed array even further provides protection from hail and heavy rain which result in defoliation of the plant or moisture induced damage.

A summation of crop yield increases associated with the implementation of the technologies described herein is presented in Table 2 below. The defense and analysis of these projected yield increases is discussed below.

TABLE 2

| Benefit Summation. | | | |
|---|---|---|---|
| Basis | Type | Conditions | Economic Impact |
| Pollination | Damaging effects of Sun and Wind | Periods of above average heat and/or gusty/strong winds | Prevention of loss from 1% to 5% per day during the pollination phase. |

TABLE 2-continued

Benefit Summation.

| Basis | Type | Conditions | Economic Impact |
|---|---|---|---|
| Wind Break | Soil erosion and damaging effects of wind | Periods of gusty/strong winds. | Up to 20% increase in yield. Significant decrease in topsoil erosion and seed scattering. |
| Drought Protection | Damaging effects associated with evaporation and transpiration. | Periods of drought | Specific application of the technology applied to 2012 drought conditions resulted in a 25% reduction in drought damage for non-irrigated fields, and an 18% reduction in water expenses for irrigated fields. |
| Hail Protection | Damaging effects associated with hail and/or heavy rain. | Hail and rain storms. Severe weather. | Protection results in 50% less yield loss during conditions specified. |

During the growth season, farmers experience a variety of risks that damage and reduce crop yields. These risks include weather phenomena such as drought, excessive heat, and hail. Through implementation of the technology in accordance with aspects of an embodiment of the invention, the possibility of yield damage, as a result of these risks, will be lowered.

The following sections go into detail on a subset of crops intended to be grown alongside solar panels implementing aspects of an embodiment of the invention and discuss the potential added benefits specific for each crop and the cover/protection regime. Corn and soybeans are discussed and they are representative of the many crops that hold the possibility of growing in partnership with the disclosed technology. Corn and soybeans, along with other full season crops such as sugar cane, tend to reap the most benefit from the partnership.

Hail, extreme heat, and drought are very probable risks during crop growth for farmers. The system and method described herein will potentially reduce the impact of these environmental risks which reduce yield. Solar panels will physically block hail from defoliating and damaging crops. Specifics for the percentage of protecting against hail damage are discussed herein with respect to certain exemplary crops.

Extreme heat and drought will be protected through the artificial manipulation of the localized environment at the base of the crops resulting from crop Cover by the panels. This Cover results in a decrease in the rate of evapotranspiration from the crop, the rate of evaporation from the soil, and the air temperature surrounding the crop.

Evapotranspiration is the combined effect of evaporation and transpiration. Water leaves a plant through stomata, pores in the plant's leaves that allow $CO_2$ and water exchange. Stomata in corn are open in the light and closed in the dark. The system and method described herein help to mitigate and balance dangerous levels of evapotranspiration, thus assisting in preventing the plant from wilting and dying.

A number of environmental factors that affect transpiration rates include: relative humidity, temperature, light, soil water concentration, and wind. Relative humidity is the percentage of water in the atmosphere compared to how much the air could potentially hold at a given temperature. A relative humidity less than 100% will result in a moisture gradient driving water to transpire from the plant into the atmosphere. Because cooler air holds less water than warmer air, shade from the technology will increase the relative humidity resulting in less of a gradient for transpiration. As a result, the plant will transpire less. This will be extremely helpful during times of extreme heat and drought.

A plant also loses water through evaporation from the soil. Without adequate soil water a plant will wilt and die, as that is the main source of water for the crop. However, Cover from the technology will reduce the evaporation rate from the soil. Depending on precipitation patterns a farmer could still be required to irrigate water to the crop; however, this technology would reduce the amount of irrigated water needed and the cost of machinery needed for irrigation.

Corn is currently the largest grown crop in the United States. It is produced for food, ethanol, and feed for livestock. In 2011, 84 million acres of corn were harvested in the US alone. However, there are certain environmental factors that can, and do, reduce yield. Drought, extreme heat, and hail are all common and possible occurrences that add risk to corn growth. The system and method described herein assists farmers in reducing the likelihood of these risks causing damage.

The length of time from planting to maturity varies depending on the corn hybrid chosen; however, the 120-day hybrid is the most commonly grown in the US, especially in the Corn-Belt. Corn development is divided into two stages, the vegetative stages and the reproductive stages. During the vegetative stages the corn plant undergoes seed germination, emergence, root growth, leaf growth, vertical growth, and finally ends with the development of tassels. These stages are numbered according to leaf number emergence (V1–Vn). The photosynthetic factory, which will provide energy and nutrients to produce kernels, develops during the vegetative stages. During the Reproductive Stages tasseling, silking, pollination, fertilization, and grain-fill occur ending with complete physiological maturation of the kernels. At this point sugars in the kernels are almost completely converted into starches. Corn growth is highly dependent on temperature and moves through its developmental stages based upon GDD's, a calculation that is used to measure changing temperature. GDD's are a cumulative addition of temperatures above a certain degree; for corn this base temperature is 50 degrees F. Refer to Table 1 above for a list of the different developmental stages along with descriptions.

A variety of stressors can reduce corn yield: drought, extreme heat, and hail. These stressors affect ear size, ear length, kernel weight, kernel number, and kernel row number. Excessive heat and drought reduce water available for the plant, stunting growth and causing leaves to wilt. Drought can desynchronize the pollen shed and silking, resulting in poor fertilization. In addition, temperatures over 95 F can dry out pollen and desiccate silks, inhibiting fertilization of the embryos. Hail can defoliate, damage, or kill an entire plant. These three stressors are a common occurrence for farmers during the growing season, frequently resulting in some lost yield. By applying this system and method as set forth herein, a farmer would be able to reduce the risk of losing yield to these very common stressors.

Throughout the corn plants' life cycle there are a number of stages during which coverage or "shading" could be implemented. From planting until emergence, 100% coverage would be applied. At this point in development it is critical that the soil is warm and moist for homogeneous emergence. Shade will prevent excessive evaporation of water from the soil and ensure that the moisture is retained. However, soil temperature should be monitored to ensure it does not fall below 50 degrees F.

From emergence to V6 (at which stage the sixth leaf has emerged, otherwise referred to herein as a first intermediate development point) no shade would be applied. It is critical that until the canopy is fully developed (V6) that the individual plants receive the maximum amount of sunlight. Starting at V6, shade would begin to increase in increments from 25% at V6 to 50% at the tasseling stage (VT, otherwise referred to herein as a second intermediate development point). These percentages of shade would assist in lowering temperatures to prevent damaging moisture loss, however, it would be a small enough percentage that we hypothesize the crop would potentially receive the needed amount of sunlight to continue growth. The photosynthetic factory is still developing; therefore, it is important that the plant absorbs the needed amount of sunlight. In addition, this technology could assist in preventing possible hail damage, which the plant is more susceptible to as it grows in height. An assumption is that this system and method described herein will protect against hail damage.

The tasseling and silking stages are extremely vulnerable and critical periods in corn development. The plant is very susceptible to moisture stress, excessive heat and physical damage from hail. Depending on the region and the date of planting, silking and tasseling will typically fall between the months of June and July during which temperatures are typically high. Therefore, a higher implementation of shade would lower temperatures and potential evaporation of moisture. In addition, most hail losses occur between the months of June-August in the Midwest Corn Belt, therefore, a higher percentage of shade could assist in protecting against hail damage that would injure tassels, silks, and the plant itself.

During the reproductive stages, the plant is very susceptible to shade. In "Physiological Mechanisms Underlying Heterosis for Shade Tolerance in Maize" study, corn was grown with 55% shade during the post silking stage resulting in a 21.4% decrease in yield (Tollenaar, 2009). In addition, 50% shade was applied in "Shading Effects on Dry Matter and Nitrogen Partitioning, Kernel Number, and Yield of Maize" study resulting in a 20% decrease in yield during the flowering stages and a 19% reduction in yield during the grain-fill stages (Reed et al., 1988). Other studies have found similar results suggesting that shade during the reproductive stages is the most detrimental to yield. As a result, the shade percentages will be reduced to 25% during the reproduction stages (otherwise referred to herein as a third intermediate development point) to accommodate for the light requirement. Depending on the use for the corn grown, shade percentages would vary. For sweet corn shade would remain at 25% until the crop reaches the milk stage, when this type is harvested. Once the corn is harvested 100% shade can be implemented. If the corn is being grown for feed or ethanol production 100% shade should not be implemented until the dent stage. At this stage photosynthesis begins to slow in the plant and stressors have little to no effect on yield. 100% shade will continue to be implemented until the crop is harvested and after. Shade may slow the length of time needed to dry the crop, but it will not have a significant effect on the yield because of the time of harvesting. Later planting dates could lead to flooding and molding due to excessive rain or snow, however, with an earlier planting date in April, this should not have a negative effect on yield. During the grain fill stage individual kernels compete for water and nutrients necessary for development and eventually starch and storage tissue deposition. Kernels without these nutrients will be aborted resulting in decreased yield. Shade could potentially lower evapotranspiration rates, thus, reducing moisture lost from the crop and soil. The graph provided in FIG. 1 shows a graphical depiction of the shading percentages against estimated dates, associated with various development stages.

These percentages of cover are consistent with data presented in the DuPont study on crop shading during the reproductive phase of corn (Strachan, Stephen, "Corn Grain Yield in Relation to Stress During Ear Development," *Pioneer*, Dupont, n.d. Web. 13 Sep. 2013).

Evapotranspiration is the combined effect of evaporation and transpiration. Water leaves a plant through stomata, pores in the plant's leaves that allow $CO_2$ and water exchange. Stomata in corn are open in the light and closed in the dark. The system and method described herein will help to mitigate and balance dangerous levels of evapotranspiration, thus assisting in preventing the plant from wilting and dying.

A number of environmental factors affect transpiration rates: relative humidity, temperature, light, soil water concentration, and wind. Relative humidity is the percentage of water in the atmosphere compared to how much the air could potentially hold at a given temperature. A relative humidity less than 100% will result in a moisture gradient driving water to transpire from the plant into the atmosphere. Because cooler air holds less water than warmer air, shade from the technology would increase the relative humidity resulting in less of a gradient for transpiration. As a result, the plant would potentially transpire less. This would be extremely helpful during times of extreme heat and drought.

A plant also loses water through evaporation from the soil. Without adequate soil water a plant will wilt and die, as that is the main source of water for the crop. However, shading from the technology will reduce the evaporation rate from the soil. Depending on precipitation patterns, this technology would reduce the amount of irrigated water needed and the cost of machinery needed for irrigation.

Corn growth is highly dependent on water. On average and in optimum conditions a single corn plant requires 21.5 inches of rainfall for a potential 100% yield. Its water requirement peaks during the tasseling and silking phases and decreases during grain-fill, resulting in a bell shaped curve. The graph provided in FIG. 2 shows corn's water requirement during optimum conditions and stress. With the implementation of the system and method set forth herein after the leaf canopy has formed the stress factors that are making the plant use more water are diminished to an extent. The shade for the crops mean that the soil will retain the moisture it has for a longer period of time as well as the decreasing the rate in which plants transpire (use water) by limiting the amount of excessive sunlight that it is exposed to. The system and method cannot completely mitigate the stress factors effect on corn water usage, but it can help ease some of the strain on the crop If there is a lack of moisture during the tasseling and silking phases pollen grains may be too dry to pollinate and silks may desiccate. As a result, pollination will not occur and yield will be drastically decreased. Once corn enters the grain-fill phase, however, it begins a drying out period as starch replaces water in the kernels and the leaves and stalks begin to dry. Iowa, the highest corn producing state in the U.S., is an optimum location for corn growth because its precipitation patterns follow corn's requirement curve. However, drought is still a potential risk to farmers. This technology could possibly mitigate those costs and reduce the amount of yield lost.

In times of stress corn can consume up to 28% more water than it normally uses during any stage of its development. The crop transpires more and the soil loses its ability to retain moisture. Corn crops are extremely susceptible to drought stress and, depending on the stage of development the crop is in, anywhere from 1-5% of final yield can be lost per day of severe stress. This is due mainly to the fact that, during drought, not only does the crop have less water to use, but it also consumes more water than it normally does. The plant has to do more with less. This can lead to staggering losses in yield for farmers. Under heat conditions in excess of 85 degrees, on average, corn will use 22.8% more water than it normally does or about 26.25 inches of water, creating a water deficit. With implementation of the technology it is hypothesized that the water requirement can be decreased by 4-6% in non-irrigated fields. For irrigated fields these savings could mean a direct reduction in variable costs such as investments in diesel fuel, labor, tractor use, and repairs.

The technology according to aspects of an embodiment of the invention also assists in preventing or reducing heat damage to the pollen grains during pollination. Dry heat desiccates corn pollen and in temperatures higher than 90 degrees pollen viability falls to about 45%, while temperatures of 100 degrees decreases viability to about 15%. The implementation of shading will decrease temperatures so that pollen loss due to heat stress is minimal.

In 2012 many of the Corn Belt states experienced a drought that negatively impacted corn yields. We hypothesize that implementation of the system and method described herein could have assisted in mitigating the negative effects the drought had on corn yields. Corn water requirement could be reduced up to 18% for both irrigated and non-irrigated fields. The graphs shown in FIGS. 3 and 4 depict the precipitation and temperature averages compared to the actual values from 2012 in Iowa. The graph shown in FIG. 5 provides a graphical depiction of the water deficit from 2012 in Iowa.

In 2012 non-irrigated fields performed poorly due to severe drought stress during critical moments in the crop's development with yield being decreased by as much as approximately 35% in some areas of Iowa. We predict that if the system and method described herein had been implemented that loss for non-irrigated fields could have been mitigated by as much as 7-12%, due to the combination of decreased water requirement and reduced heat stress in shade. This is a conservative prediction.

Figure 6:
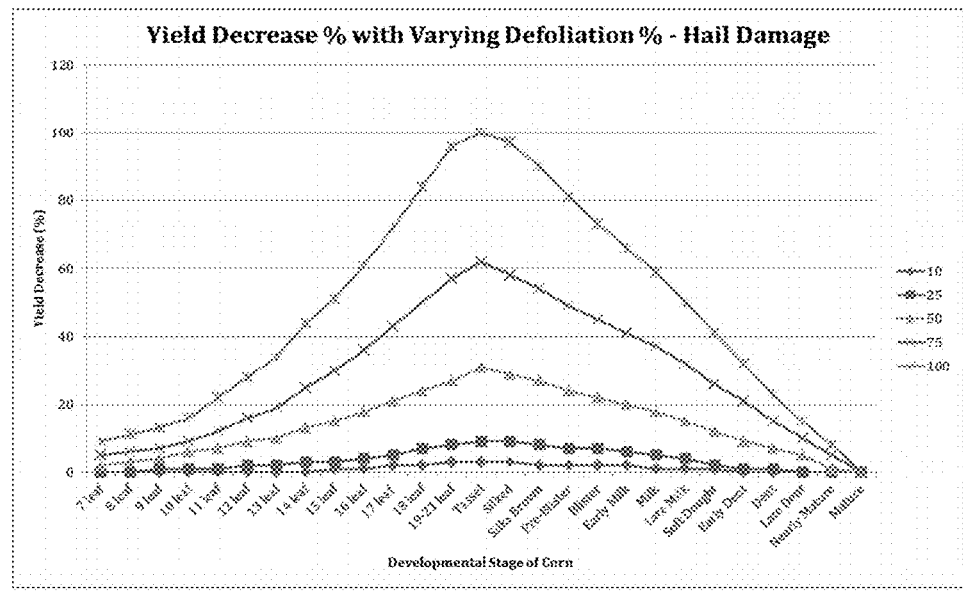
FIG. 6 is a graphical representation of decrease in corn yield with varying percentages of defoliation.

Further, corn is a very top-heavy crop with wide leaves; these two factors combined make it especially susceptible to hail damage. The graph shown in FIG. 6 demonstrates how much potential yield could be lost corresponding to percent defoliation over the course of the growth season. Defoliation is assumed to be synonymous with greater corn damage. This is shown against the many different stages of corn development. At any percentage of hail damage, the greatest negative impact occurs during the tasseling and silking stage continuing into the grain filling stage. Hail damage at the beginning of corn growth does not have a huge negative impact because the corn is still able to recuperate, however, as the plant grows taller it becomes more susceptible and once tasseling and silking occurs hail has a massive impact. Tassels and silks are delicate and easily destroyed, thus decreasing grain yield. In addition, corn is extremely susceptible to hail damage during the grain filling period till the dent stage. We are assuming that this technology, with increases in its percentages of shade (covering of the corn) during these periods of the corn development could assist in lowering the damage hail would have. Therefore, the season would result in a lower yield lost to hail damage as an added side effect of the solar panels placement.

Corn is most at risk during the tasseling and silking phases again due to the fact that the plant has no time to recover from the damage. If leaves are destroyed while the plant is still young the crop can recover. In terms of hail, during the months of June, July, and August corn is the most susceptible to hail damage with severe hail damage and defoliation of the crop leading to complete loss of yield. A method according to certain aspects of an embodiment of the invention will begin shading the crop starting once the canopy is formed and will steadily increase shading up to 50%. This increase in shading correlates with the susceptibility of the crop to hail damage. We assume that the percentage of shade will correlate directly with protection from hail damage. For example, if a hailstorm were to take place during the tasseling stage that would normally defoliate 50% of the plant leading to a 25% reduction in yield for those plants affected, it would instead only defoliate 25% of the crop and lead to a 10% reduction in yield for those crops affected.

Wind stress and soil erosion are still further challenges to crop yield. Windbreaks are barriers used to reduce and redirect wind. They usually consist of trees and shrubs, but may also be perennial or annual crops and grasses, fences, or other materials. The most important factor of the windbreak is its height as it affects the most area. Wind speed can be reduced in an area two to five times taller than the break and this is compounded the more windbreaks that are used.

The main factors, besides height, that make a windbreak effective are the density of the breaks, how they are oriented, and their length.

The reduction in wind velocity behind a windbreak leads to a change in the microclimate within the protected zone. Temperature and humidity levels usually increase, decreasing evaporation and plant water loss. Actual temperature modifications for a given windbreak depend on windbreak height, density, orientation, and time of day. Daily air temperatures within 10H leeward of a windbreak, are generally several degrees higher than temperatures in the open. Beyond 10H, air temperatures near the ground tend to be cooler during the day. On most nights, temperatures near the ground in sheltered areas (0H to 30H) are slightly warmer than in the open. However, on very calm nights, sheltered areas may be several degrees cooler than open areas. Soil temperatures in sheltered areas are usually slightly warmer than in unsheltered areas. Taking advantage of these warmer temperatures may allow earlier planting and germination in areas with short growing seasons. In the area next to an east-west windbreak soil temperatures are significantly higher on the south side due to heat reflected by the windbreak.

Higher humidity decreases the rate of plant water use, so production is more efficient than in unsheltered areas. However, if the windbreak is too dense, and humidity levels get too high, diseases may become a problem in some crops.

Yields are usually reduced in areas immediately adjacent to the windbreak but areas both up and downwind from the break see a rise in overall yield. This is due to a lot of factors including increased humidity, decrease in soil erosion, and decrease in wind related damages.

Figure 7:
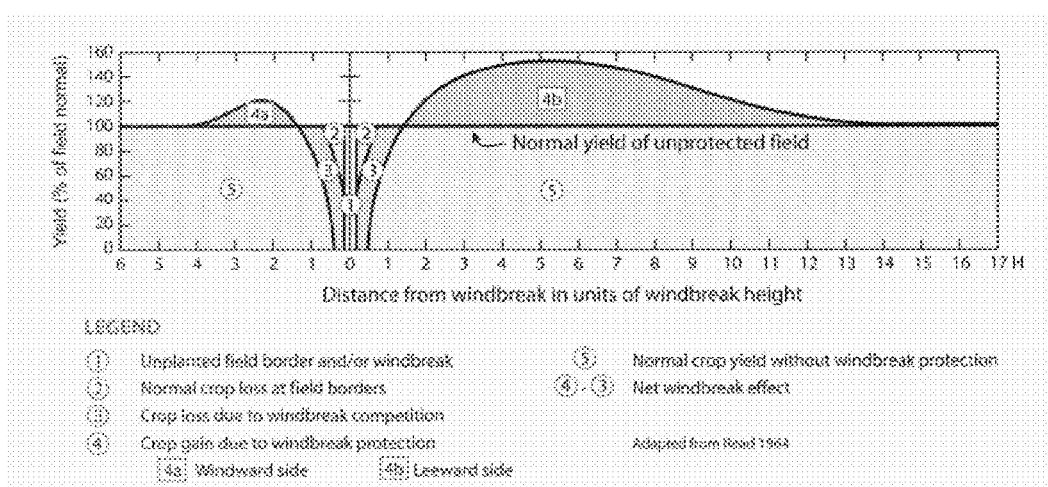
FIG. 7 is a graphical representation of corn crop yield increase with respect to distance from a windbreak.
Figure 10:
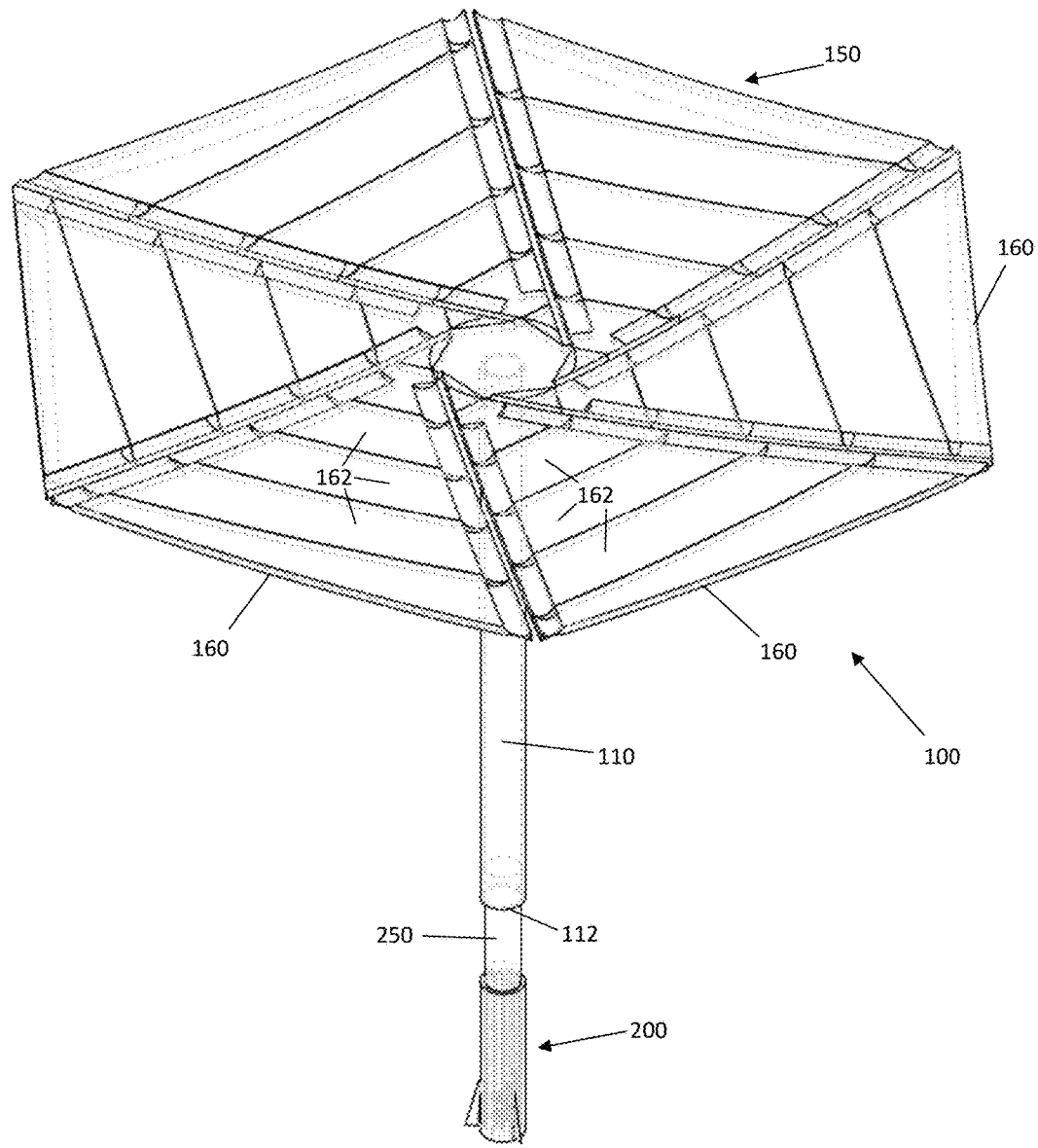
FIG. 10 is a perspective view of a deployable, removable solar collector in accordance with certain aspects of an embodiment of the invention.
Figure 11A:
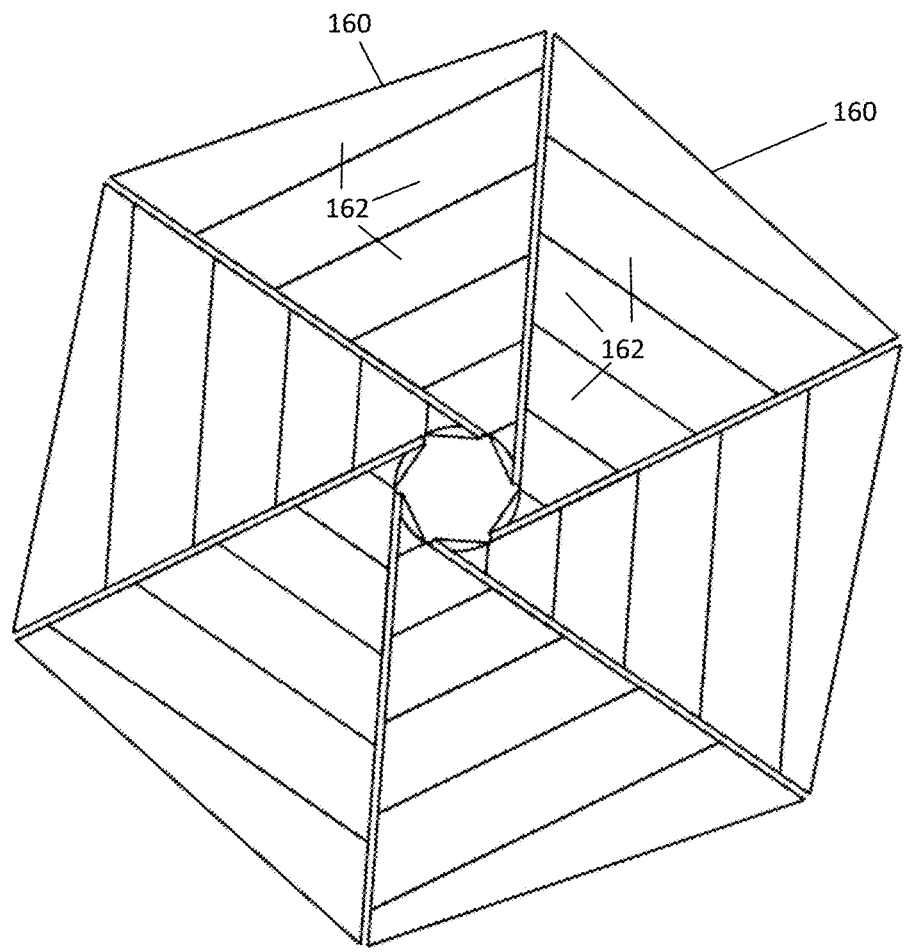
FIGS. 11(a) and 11(b) are top and side views, respectively, of a panel array for use with the solar collector of FIG. 10 in a fully deployed position.
Figure 11B:
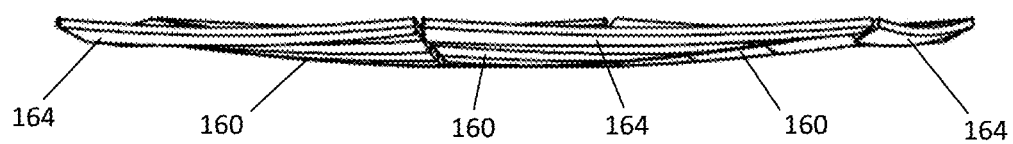
Figure 12A:
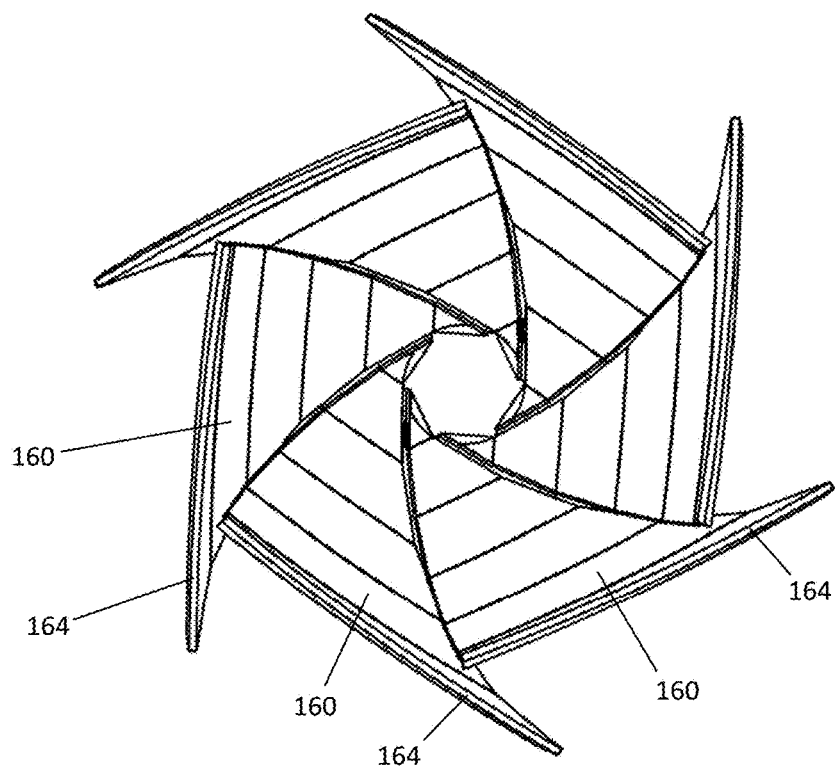
FIGS. 12(a) and 12(b) are top and side views, respectively, of the panel array of FIGS. 11(a) and 11(b) in a position slightly collapsed from the position of FIGS. 11(a) and 11(b).
Figure 12B:
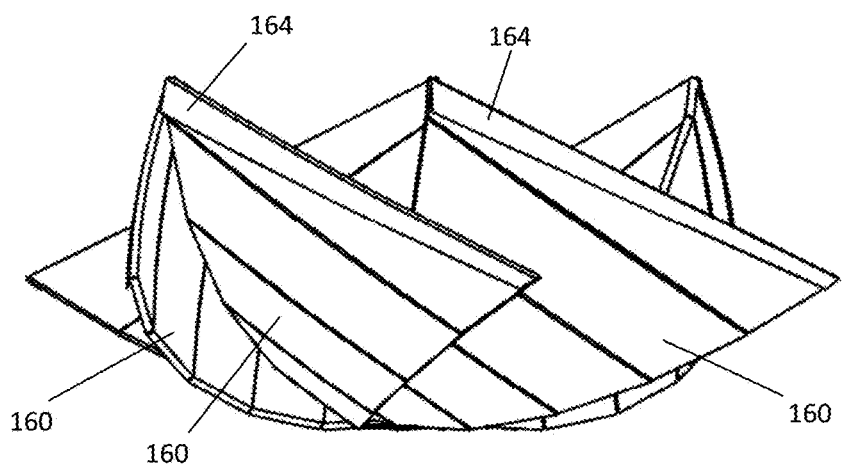
Figure 13A:
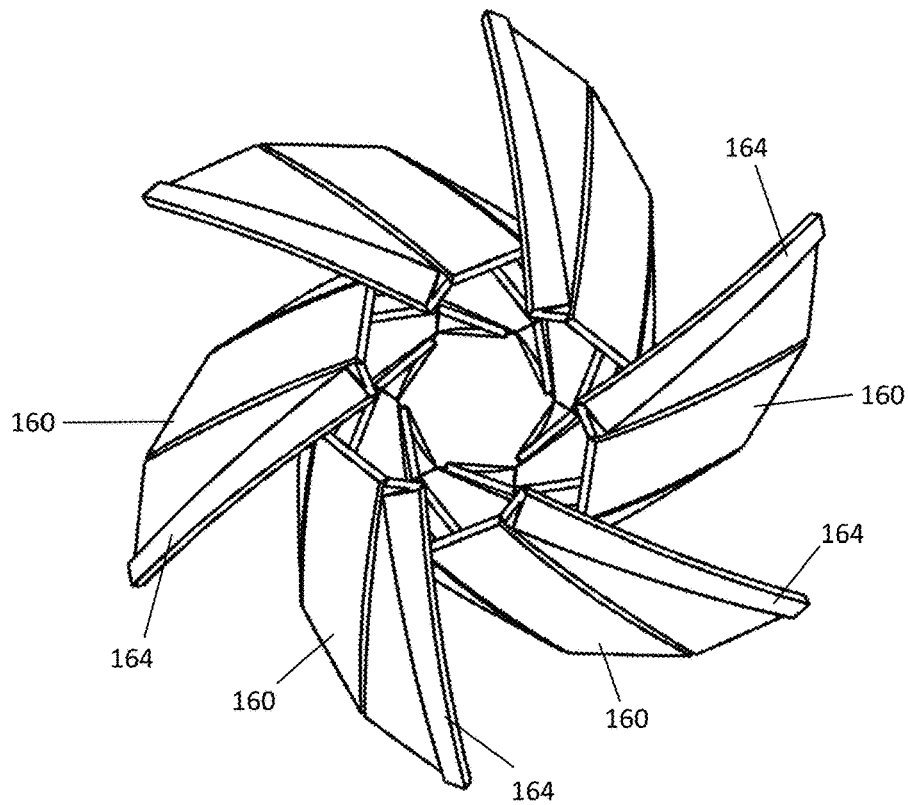
FIGS. 13(a) and 13(b) are top and side views, respectively, of the panel array of FIGS. 11(a) and 11(b) in a position slightly collapsed from the position of FIGS. 12(a) and 12(b).
Figure 13B:
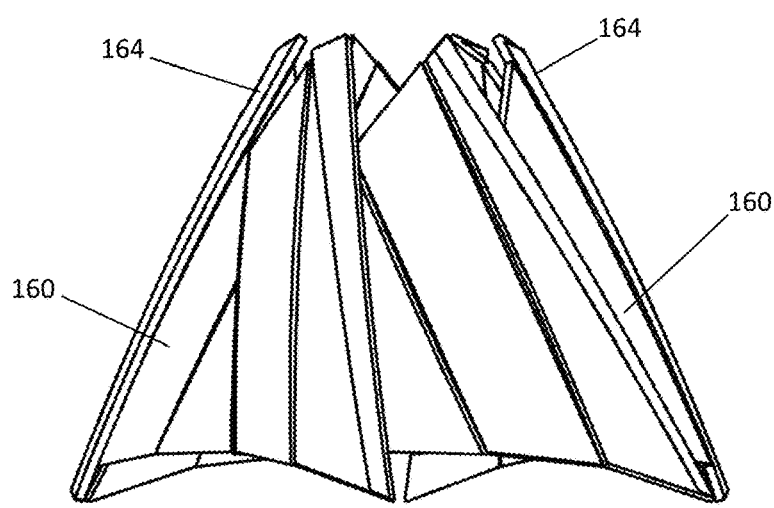
Figure 14A:
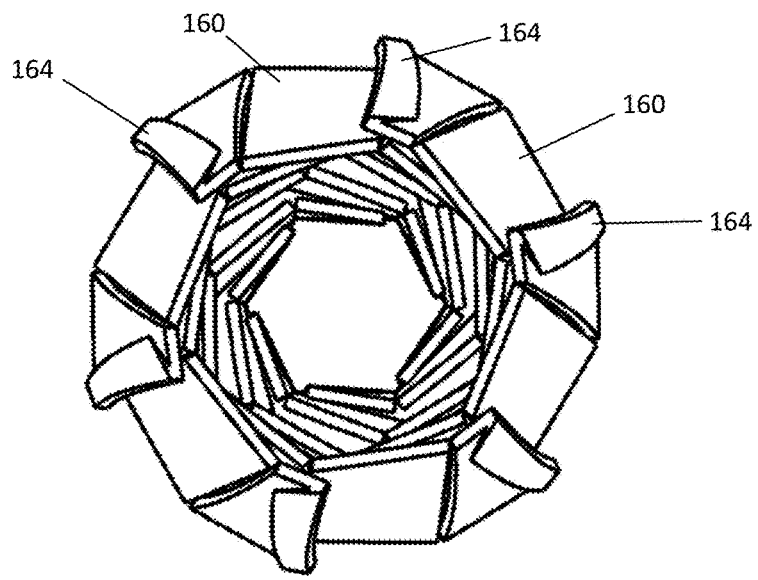
FIGS. 14(a) and 14(b) are top and side views, respectively, of the panel array of FIGS. 11(a) and 11(b) in a position slightly collapsed from the position of FIGS. 13(a) and 13(b).
Figure 14B:
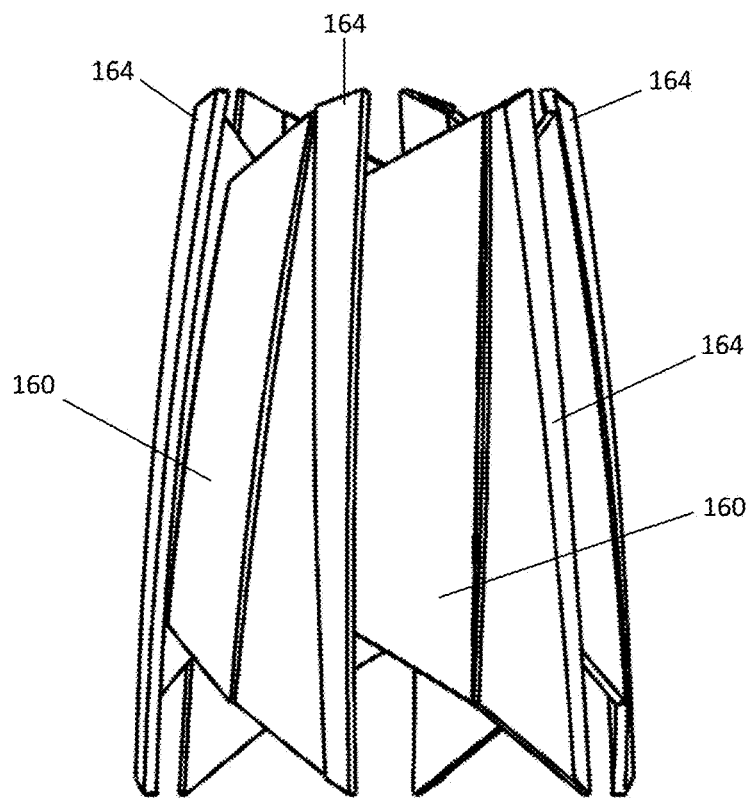

Yield increases with respect to distance from a windbreak are presented in FIG. 7.

A system and method deployed in accordance with certain aspects of an embodiment of the invention has the potential to decrease risk to farmers growing corn without harming the crop or decreasing yields. By mitigating losses due to heat stress, drought stress, wind, and hail damage impacts could be reduced resulting in increased yield.

The coverage percentages presented herein follow the limitations identified in the DuPont study described above. That particular study used a constant shade model which forced certain light levels at the plant. Since the technology disclosed herein may be easily configured to different light levels, the inventor believes that the percentages are highly conservative.

Soybeans are another exemplary crop that may benefit from the system and method described herein. Soybeans are the second most grown crop in the United States. In 2013 a little over 3.2 billion bushels were produced for consumption and cattle feed. There are many risks during soybean growth that can potentially decrease yield such as drought, hail, and extreme temperatures. The system and method disclosed herein has the potential to decrease the influence of these risks with the added benefit of reducing the costs of solar energy to a more affordable price.

The soybean plant is a short day flowering crop highly dependent on photoperiod and temperature. There are ten different maturity groups that are physiologically accustomed to growing in a certain region. These regions are divided up by latitude according to the number of hours of sunlight that that region receives throughout the year. Within these maturity groups there are over 2500 different varieties. Soybeans are unique in that the succession from one growth stage to another growth stage depends on the change of hours of sunlight throughout the growing season in addition to warm enough temperatures. If a soybean type usually grown in the South is planted further north this will result in a longer vegetative stage and a later maturity because this type is physiologically attuned to shorter days and higher temperatures. In contrast, if a soybean variety usually planted further north is planted in a more southern region, the crop will flower sooner and mature earlier. This occurs because the crop is attuned to longer days and cooler temperatures.

Soybean development can be divided into vegetative and reproductive stages. There are two main types of soybeans: indeterminate and determinate soybeans. Determinate types cease vegetative growth once the plant enters the reproductive stages and are most commonly grown in more southern regions. Indeterminate types, however, continue to grow vegetation well into the reproductive stage and are more commonly grown in more northern regions, for example, the Midwest.

The Vegetative Stages begin with the emergence of the plant (VE). Next the plant enters the VC stage during which the unifoliate leaves unfold from the plant. The naming system of the following stages follows a number system based upon the number of unfolded trifoliate leaves. It begins with V1 (unfolding of the first trifoliate leaf) to Vn (unfolding of the nth trifoliate leaf).

The Reproductive Stages begin once there is at least one flower on any node (R1). The plant enters R2 (Full flowering) when there is an open flower on one of the two uppermost nodes. R3 (Beginning pod) begins once pods are $3/16$ inch at one of the four uppermost nodes. R4 (Full pod) begins once the pods are $3/4$ inches at one of the four uppermost nodes. Once the plant enters R5 (Beginning seed) a seed is $1/8$ inch long in the pod at one of the four uppermost nodes on the main stem. The plant enters R6 (Full seed) once there is a pod at one of the four uppermost nodes on the main stem that contains a green seed that fills the pod to capacity. R7 (Beginning maturity) begins once at least one normal pod on the main stem has reached its mature pod color. The last stage, R8 (Full Maturity), begins once 95% of the pods have reached their full mature color.

There are a number of periods during which shading through deployment of the system and method described herein could be implemented during soybean development. From planting to emergence (VE) the plants would be shaded 25%; this would assist with ensuring that the soil remains moist, a very critical requirement for soybean germination. The seed absorbs about 50% of its weight in water. The soil temperature will need to be monitored by the farmer because temperatures below 50 F can slow down or terminate germination of the seeds. From VE to V6 there will be no shade because the canopy has not yet completely formed and complete light interception is important to develop the photosynthetic factory within the plant.

Once the canopy has fully formed during the V6 stage shading will be applied beginning at 25% and increasing in increments to 50% until the R3 stage. Stages R3-R6 are very critical for soybean yield. It is during this period that pod growth and seed fill occurs. In addition, once the plant enters the reproductive stages the rate of photosynthesis increases. Soybean yield is related to the crop's ability to capture radiation immediately after flowering. As a result during stages R3-R6 zero shade will be applied to ensure optimum yield. Once the plant reaches R7, 100% shade can be applied until harvest as photosynthesis has essentially stopped and physiological stress will not decrease yield. The graph shown in FIG. 8 provides a graphical depiction of the soybean shading regime.

Soybeans are highly dependent on photoperiod for development succession. Early flowering has been linked to higher yields. Flowering is usually stimulated near the summer solstice, June $21^{st}$, as the days begin to shorten. As the days continue to shorten this causes the plant to enter the different stages of the reproductive phases.

A recent study shows that short days elicit a greater efficiency rate of seed filling (how many flowers develop into fully matured seeds) than do longer days. A typical soybean plant will abort 60-75% of its flowers before pods begin to form. If this number can be increased (efficiency rate of seed filling) it would result in a greater yield. In addition, past studies have shown that longer photoperiods post flowering lengthen the reproductive phase resulting concomitantly with an increase in pod and seed number. Overall, a longer reproductive phase results in greater seed filling and yield concomitantly. We hypothesize that by beginning to shade at V6 we could promote early flowering.

According to Kantolic, shading did not significantly reduce the number of nodes per plant (nodes equate to the maximum number of pods that can develop). Then, by reducing that shade once the plant begins developing pods the overall length of the reproductive stages would be lengthened allowing a greater length of time for pod and seed fill as a result. Kantotic found that a longer reproductive phase was found to be equivalent to increasing photosynthesis over a shorter period. With a longer photoperiod the number of pods per node increased as a result. Therefore, the actual yield of the soybean plant would potentially be increased as a result of the changing shading regime.

There are two critical stages in soybean development for water stress. The first critical stage occurs during planting during which the seed absorbs 50% of its weight in water, a necessity for emergence. The second critical stage occurs from flowering to pod-fill. This period typically lasts about 8-10 weeks and an individual plant uses between $\frac{1}{4}$-$\frac{1}{3}$" of water per day. Drought during this period causes flowers and young pods to abort. The number of seeds per pod is a genetic characteristic, however, weight and size of seeds depends on the environmental conditions in the last 3-4 weeks of the growing season. From the $2^{nd}$ to $4^{th}$ week of seed fill a 39-45% yield decrease can occur when there are four days of visible moisture stress. Through the use of shading and a decrease in temperature as provided by the system and method described herein, lowered risks of drought are achieved by decreasing transpiration rates and soil evaporation.

Evapotranspiration is the combined effect of evaporation and transpiration. Water leaves a plant through the stomata, pores in the plant's leaves that allow $CO_2$ and water exchange. Stomata in soybeans are open in the light and closed in the dark. Similarly to corn, the system and method described herein will assist in mitigating and balancing dangerous levels of evapotranspiration, thus assisting with preventing the plant from wilting and dying.

Soybean plants are likewise the most susceptible to hail damage during R5. During this stage defoliation due to hail damage can drastically reduce yield because the leaves are photosynthesizing to add nitrogen and starch to the seeds (seed filling). For example, during a 50% defoliation during R5 there can be a 17% decrease in yield. While the system and method described herein may not be implemented during the most critical period it is still present during other stages that will protect against unnecessary damage to the crop due to hail. The crop is susceptible to yield loss from hail damage at any stage. We assume that the system and method described herein will be able to mitigate those risks, potentially reducing the chance of extreme hail damage. Similarly to corn, we assume that the percentage of shade will correlate directly with protection from hail damage. For example, during R5 50% defoliation results in a 17% yield loss for the indeterminate soybean variety. However, with the system and method described herein, this would be reduced to 10-12% yield loss. The graph of FIG. 9 provides a depiction of soybean yield loss in relation to percent defoliation during the different stages of growth.

A system and method provided in accordance with certain aspects of an embodiment of the invention thus has the potential to reduce the risks of drought, extreme temperatures, and hail on soybean yield.

II. Solar Collection Array System for Use in Crop Management

The foregoing discussion makes clear the benefits that may be obtained through close management of a shade and protective cover environment for various crops to optimize crop yield, and particularly using a solar collector array to provide such shade and protective cover environment. However, commercially available solar collectors do not lend themselves to such use, as they are typically fixed, generally inflexible installations that are too unwieldy to meet the need to quickly deploy, retract, and change position to vary the amount of light that would pass through to the crops, to protect the crops for quickly varying weather conditions, and to protect the array structure itself from adverse weather conditions.

FIGS. 10 through 19 show various aspects of a solar collector for use with a solar collection array system in accordance with certain aspects of an embodiment of the invention. The system is configured to allow the array to be removed from a crop without removing the mounting infrastructure, which is placed in the ground below crop plowing level (preferably approximately 10-12 inches depending upon the specific crop). The array and mounting pole may be removed from the in-ground mount so that the field may be tilled and/or harvested. Likewise, the mount itself may be compressed into the ground for plowing, and may be redeployed to an above-ground, array-engaging position after plowing.

Figure 15A:
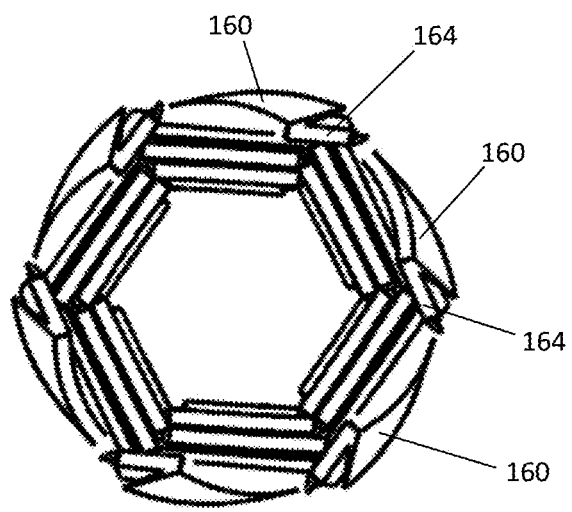
FIGS. 15(a) and 15(b) are top and side views, respectively, of the panel array of FIGS. 11(a) and 11(b) in a fully collapsed position that is slightly collapsed from the position of FIGS. 14(a) and 14(b).
Figure 15B:

With particular reference to FIGS. 10 through 15, a solar collection array according to certain aspects of an embodiment of the invention comprises a deployable, removable, pole-mounted solar collector (shown generally at 100) that is reconfigurable from a deployed position (shown in FIG. 10) to a folded, collapsed position (shown in FIG. 15). FIGS. 11 to 15 shown panel array 150 of solar collector 100 in progressive stages of folding (each Figure providing a top view and a side view) from fully deployed in FIG. 11 to fully collapsed in FIG. 15. In the deployed position of FIG. 10, the solar collector 100 maximizes collection of solar energy for the production of electricity and simultaneously serves as a shade, windbreak, and hail shield for crops positioned below the array. The solar collector 100 includes panel array 150 mounted on a semi-flexible support pole 110, allowing solar collector 100 to bend and the panel array 150 to partially collapse in heavy wind conditions to prevent damage to the assembly, but while providing sufficient support to keep the panel array 150 upright when in normal environmental conditions. Likewise, in the collapsed position of FIG. 15, the panel array 150 maintains a "ready-to-deploy" status while maximizing sun exposure for the crops surrounding the assembly.

Support pole 110 has an open, hollow bottom allowing it to be inserted onto a telescoping mounting post 250 of telescoping base 200 as discussed in greater detail below. Further, each panel array 150 includes individual panels 160, each of which is slidably attached at an inner end to support pole 110 allowing the inner portion of each individual panel 160 to be moved up and down. Panels 160 may comprise separate panel sections 162, and each individual panel 160 preferably has a slightly concave contour (as best seen in the side view of panel array 150 of FIG. 11(b)). As best viewed in FIGS. 10 and 11(a), each panel 160 also tapers as it gets closer to support pole 110. Further, and as best seen in FIGS. 11 through 15, each panel 160 preferably has a folded-over outer rim 164 that may aid in air and water flow on and around panel array 150.

Optionally, panel sections 160 may be removable, such that each panel section 160 may be selectively replaced with specially configured panels that control light levels and water (diffusion) based on the needs of the particular crop.

As mentioned above, solar collector 100 in accordance with certain aspects of an embodiment of the invention includes a telescoping base, a flexible plastic support pole 110, and a panel array 150. Panel array 150 includes multiple individual panels 160 carrying photovoltaic cells on the top surface of each panel 160.

As shown in the side view of FIG. 16(a), telescoping base 200 includes a stationary main tube 210 and a telescoping mounting post 250 that is extensible from one end 211 of main tube 210. Stationary main tube 210 is configured for placement within the ground so that the end 211 of main tube 210 is positioned below the ground surface. Thus, when the deployable, removable solar collector 100 is not in use, telescoping base 200 will not interfere with a plow or other equipment operating in the crop field in which telescoping base 200 is installed. By way of non-limiting example, when telescoping mounting post 250 is in the retracted position shown in FIG. 16(a), a mounting post head 252 (former the highest tip of the telescoping base 200) may be positioned approximately 10 to 12 inches below the ground surface (depending upon the particular crop). To aid in positioning telescoping base 200 within the ground, a helical screw 212 extends around the outer perimeter of main tube 210 to assist in both placement of main tube 210 into the ground and holding it in place after such placement. An electrical conduit 214 is also provided and extends from the top end of main tube 210 to the bottom end of main tube 210 so as to provide power to a solenoid-actuated release within main tube 210, as will be discussed in greater detail below. Such electrical conduit 214 is preferably configured for electrical connection to a power line (not shown) that me be installed beneath the surface of the ground to interconnect multiple solar collectors 100 to a single power and control source.

As shown in FIG. 16(b), when it is desired to install a solar collector 100, telescoping mounting post 250 is released from the interior of main tube 210 and automatically extends upward under the force of a compression spring 254 (FIGS. 17 and 18, discussed in greater detail below) to the extended position shown in FIG. 16(b). An upper shaft support 216 is positioned at the top end of main tube 210 and provides a guide for telescoping mounting post 250 as it extends from main tube 210. A water tight seal may optionally be provided between telescoping mounting post 250 and upper shaft support 216 in any conventional configuration that will allow easy movement of telescoping mounting post 250. Once deployed to the position shown in FIG. 16(b), telescoping mounting post 250 may be removably placed within the open, hollow bottom 112 of support pole 110 of a solar collector 100.

FIG. 17 provides a partial sectional view of the entire telescoping base assembly 200, and FIG. 18 provides close up partial sectional views of various sections of base assembly 200. With continuing reference to those Figures, a latch assembly 300 is provided at the bottom, interior end of main tube 210, which latch assembly 300 releasably holds the bottom end 251 of mounting post 250 down and in its fully retracted position against the bias of compression spring 254. Compression spring 254 is configured to drive mounting post 250 upward to its extended position (shown in FIG. 16(b)) when mounting post 250 is released from latch assembly 300. More particularly, a post carrier 256 in the form of a circular ring is affixed to the exterior of mounting post 250, the bottom face of which provides a reaction surface against compression spring 254. The opposite end of compression spring 254 is positioned against lower shaft support collar 258, which collar 258 is fixedly mounted to the interior of stationary main tube 210. Thus, when latch assembly 300 releases the bottom end 251 of mounting post 250 (as discussed in greater detail below), compression spring 254 pushes against the bottom of post carrier 256 so as to push mounting post 250 upward through upper shaft support 216 and toward its extended position.

Figure 19:
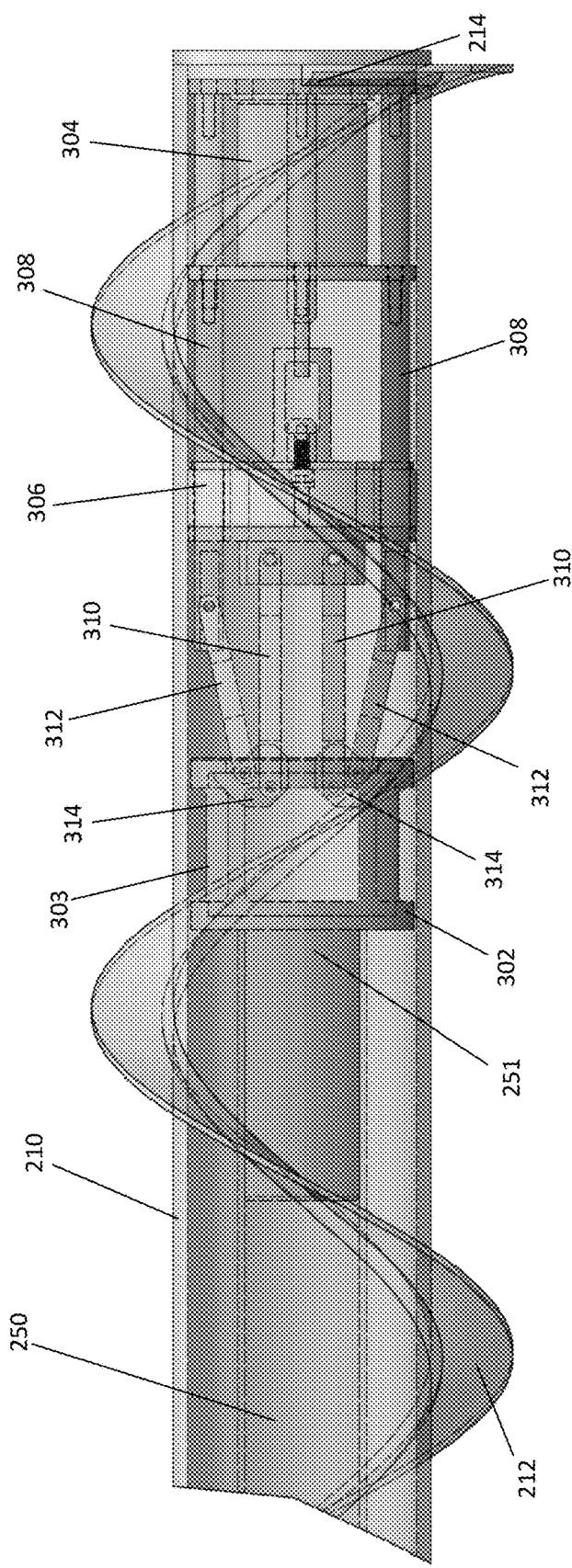
FIG. 19 is a close-up, exploded, partially cross-sectional view of the telescoping base of FIG. 18.

Latch assembly 300 is shown in greater detail in FIG. 19, and includes a shaft latching ring 302 affixed to the bottom end 251 of mounting post 250, which latching ring 302 carries the bottom end 251 of mounting post 250 through the interior of main tube 210. An electrically powered solenoid 304 is positioned in the bottom end of main tube 210 and is in electrical communication with electrical conduit 214. Electrical conduit 214 preferably extends along the helical plane formed at the intersection of helical screw 212 with the exterior of main tube 210 for the full length of helical screw 212, and at the bottom of main tube 210 extends interiorly to contact solenoid 304. Preferably, the bottom end of main tube 210 is closed with a removable end cap so as to allow service access to latch assembly 300. The actuator of solenoid 210 is affixed to a slide puck 306, which slide puck 306 is mounted on cam support bars 308 for slidable movement within main tube 210. Interior cam arms 310 are pivotably joined at one end to slide puck 306, and at an opposite end to a cam latch 314. Likewise, exterior cam arms 312 are pivotably joined at one end to cam latch 314, and at an opposite end to support bars 308. Cam latches 314 engage a bottom end of shaft latching ring 302 when mounting post 250 is in its fully retracted position. When solenoid 304 is powered, its actuator pulls slide puck 306 downward, in turn pivoting each cam latch 314 out of engagement with shaft latching ring 302, in turn allowing compression spring 254 to drive mounting post 250 upward toward its extended position.

Preferably, shaft latching ring 302 includes a locking bar 303 that may manually engage lower shaft support collar 258 to lock mounting post 250 in its extended position. Thus, once mounting post 250 has been pushed by compression spring 254 to its extended position, mounting post 250 may be manually grasped, turned through for example a right-handed ¼ locking turn so as to cause locking bar 303 on latching ring 302 to engage a locking surface on lower shaft support collar 258. This will vertically lock mounting post 250 in place unless mounting post 250 is manually turned in the opposite direction so as to unlock shaft latching ring 302 from lower shaft support collar 258.

When it is desired to plow a field in which such solar collectors 100 are deployed, solar collector 100 may be removed from mounting post 250 of base 200, and mounting post 250 may be pushed downward into main tube 210, compressing spring 254 and engaging cam latches 314 on shaft latching ring 302.

The foregoing assembly, and preferably multiple assemblies configured as above, is positioned in a crop field. As crops can benefit from shading in certain environmental conditions, the deployment of the panel arrays 150 may be controlled so as to maximize beneficial shading, wind protection, and hail protection of the crops positioned below the assemblies. Particularly, the panel arrays 150 may be deployed and contracted to match an optimal shade curve for the particular crop that is known to maximize crop yield.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A method for managing crop yield through varied shading of a crop in the crop field, comprising the steps of:
    providing a plurality of reconfigurable solar collectors, each said reconfigurable solar collector comprising:
    a telescoping base including a telescoping mounting post extensible from said base and being retractable to a position in which a top end of said telescoping mounting post is positioned below a soil surface of said crop;
    a support pole removably mountable on said telescoping mounting post; and
    a panel array comprising a plurality of panels, wherein each panel is movably mounted on said support pole from a first, generally horizontal position providing a maximum amount of shade to crops located below said panel array toward a generally vertical position, said panel array mounting at least one photovoltaic cell;
    positioning said plurality of support poles on said telescoping bases; and
    reconfiguring said panel array to vary a shading over said crop field.

2. The method of claim 1, said step of reconfiguring said panel array to vary a shading over said crop field further comprising the steps of:
    causing said panel array to provide 25% to 100% shade over crops in said crop field from planting of said crops to plant emergence;
    causing said panel array to provide 0% shade coverage from plant emergence to a first intermediate development point;
    causing said panel array to incrementally increase a percent of shade coverage from the first intermediate development point after plant emergence to a second intermediate development point; and
    causing said panel array to further increase a percent of shade coverage to a maximum maturity stage of said plant.

3. The method of claim 2, further comprising the step of:
    after causing said panel to incrementally increase a percent of shade coverage and before causing said panel array to further increase a percent of shade coverage, causing said panel to reduce a percent of shade coverage during a third intermediate development stage.

4. The method of claim 3, wherein said step of causing said panel to reduce a percent of shade coverage during a third intermediate development stage further comprises reducing said percent of shade coverage to 25% shade coverage.

5. The method of claim 2, said step of causing said panel array to incrementally increase a percent of shade coverage further comprises causing said panel array to incrementally increase said percent of shade coverage from 25% shade coverage to 50% shade coverage.

6. The method of claim 2, said step of causing said panel array to further increase a percent of shade coverage to a maximum maturity stage of said plant further comprises causing said panel array to increase said percent of shade coverage to 100% shade coverage.

7. The method of claim 1, wherein said step of reconfiguring said panel array to vary a shading over said crop field is configured to mitigate crop losses due to at least one of heat stress, drought stress, wind, and hail damage.

8. The method of claim 1, wherein said telescoping base further comprises a fixed tube having a latch mechanism configured to releasably hold a bottom end of said telescoping mounting post.

9. The method of claim 8, wherein said telescoping mounting post is spring biased toward an extended position, and wherein said base is configured to automatically move said telescoping mounting post from a retracted position to said extended position upon release of said latch mechanism.

10. The method of claim 9, wherein said telescoping base further comprises a shaft latching ring affixed to a bottom end of said telescoping mounting post.

11. The method of claim 10, wherein said latch mechanism further comprises at least one cam latch releasably engaging said shaft latching ring, and a solenoid actuator mechanically engaging said cam latch to release said shaft latching ring upon powering of said solenoid.

12. The method of claim 9, wherein each said reconfigurable solar collector further comprises a post carrier fixedly attached to an outer surface of said mounting post, a lower shaft support collar fixedly attached to an interior of said fixed tube, and a spring positioned between said post carrier and said lower shaft support collar.

13. The method of claim 1, wherein each of said panels has a maximum width at a first end thereof furthest from said support pole and a minimum width at a second end opposite said first end, wherein each said panel is movably mounted to said support pole at said second end.

14. The method of claim 1, wherein at least one panel in said panel array comprises at least one removable panel section.

15. The method of claim 1, wherein said telescoping base further comprises a fixed tube, wherein said telescoping mounting post is extensible from a top end of said fixed tube.

16. The method of claim 1, wherein each panel is mounted on said support pole to automatically move in response to excessive wind impacting said panel array.

* * * * *